United States Patent
McGehee et al.

(10) Patent No.: US 7,870,880 B2
(45) Date of Patent: *Jan. 18, 2011

(54) OPTIMIZING PLANER INFEED SYSTEM AND METHOD

(75) Inventors: Ronald W. McGehee, Ukiah, CA (US); Patrick Doyle, Ukiah, CA (US)

(73) Assignee: USNR/Kockums Cancar Company, Vancouver, WA (US)

( * ) Notice: Subject to any disclaimer, the term of this patent is extended or adjusted under 35 U.S.C. 154(b) by 935 days.

This patent is subject to a terminal disclaimer.

(21) Appl. No.: 10/552,856

(22) PCT Filed: Apr. 14, 2004

(86) PCT No.: PCT/CA2004/000562

§ 371 (c)(1), (2), (4) Date: Oct. 12, 2005

(87) PCT Pub. No.: WO2004/089584

PCT Pub. Date: Oct. 21, 2004

(65) Prior Publication Data

US 2007/0102063 A1    May 10, 2007

(51) Int. Cl.
*B23Q 15/00* (2006.01)
(52) U.S. Cl. .................. 144/382; 144/394; 144/404; 144/245.1; 144/1.1; 144/3.1

(58) Field of Classification Search ............ 144/1.1, 144/2.1, 3.1, 39, 114.1, 117.1, 245.1, 246.1, 144/248, 250.17, 382, 394, 404, 402
See application file for complete search history.

(56) References Cited

U.S. PATENT DOCUMENTS

| | | | |
|---|---|---|---|
| 4,823,851 A | | 4/1989 | Seffens |
| 4,879,659 A | * | 11/1989 | Bowlin et al. ............... 700/167 |
| 5,417,265 A | | 5/1995 | Davenport et al. |
| 5,765,617 A | * | 6/1998 | Mierau et al. ............... 144/387 |
| 5,884,682 A | * | 3/1999 | Kennedy et al. ............ 144/357 |
| 7,490,641 B2 | * | 2/2009 | McGehee et al. ........ 144/117.1 |
| 2007/0267104 A1 | * | 11/2007 | McGehee et al. ............ 144/373 |

FOREIGN PATENT DOCUMENTS

| | | |
|---|---|---|
| CA | 2247065 | 3/2000 |
| EP | 0504442 | 9/1992 |

* cited by examiner

*Primary Examiner*—Shelley Self
(74) *Attorney, Agent, or Firm*—Schware, Williamson & Wyatt

(57) ABSTRACT

An optimizing planer infeed system for feeding an array of workpieces downstream to a planer includes an apparatus for setting the size of the gaps between successive linearly aligned workpieces so that each gap between successive workpieces provides enough time for at least one of movable cutting elements in the planer and movable guiding elements to be moved to their optimized position corresponding to the next successive workpiece.

26 Claims, 29 Drawing Sheets

CONVENTIONAL PLANER INFEED SYSTEM

CONVENTIONAL PLANER INFEED SYSTEM

SIMPLIFIED EXAMPLE OF FULLY OPTIMIZED GAP CONTROL

LUG TRANSFER DEVICE FEEDING WORKPIECES
ONTO A LINEAR ACCELERATION DEVICE

LUG LOADER TYPE DEVICE SHEET FEEDER

SHEET FEEDER

SHEET FED TRANSVERSE ACCELERATION DEVICE COMBINED WITH
VERTICAL ACCELERATION DEVICE AND LINEAR ACCELERATION DEVICE

ALTERNATE SHEET FED VERTICAL ACCELERATION

CONTINUOUS INDEXIBLE SUPPORT ARM
VERTICAL ACCELERATION DEVICE

SHEET FED HOPPER FEEDER DEVICE

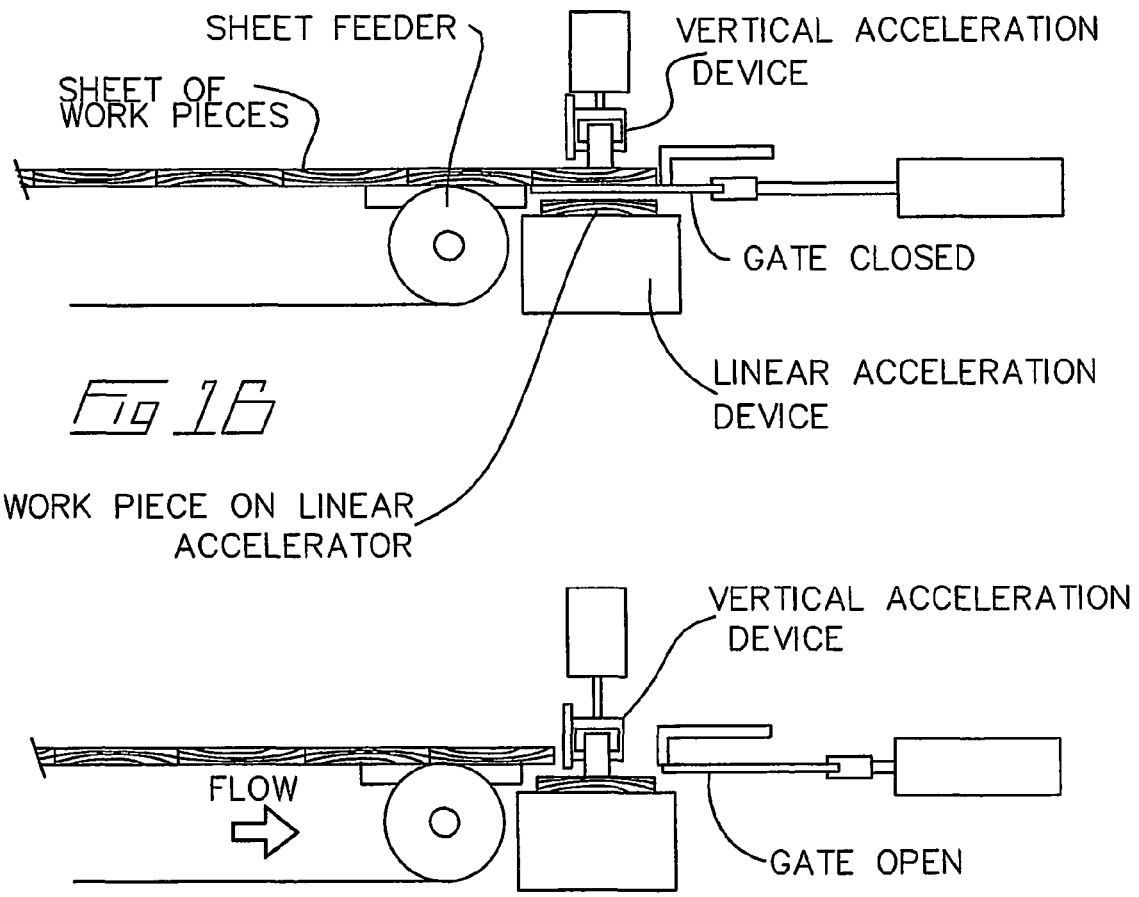

TRANSVERSE ACCELERATION DEVICE
FEEDING LINEAR ACCELERATION DEVICE

TRANSVERSE ACCELERATION DEVICE
FEEDING LINEAR ACCELERATION DEVICE

TRANSVERSE ACCELERATION DEVICE
ADJUSTABLE WHEEL TYPE

TRANSVERSE ACCELERATION DEVICE

TRANSVERSE ACCELERATION DEVICE
SLIDER CRANK TYPE

TRANSVERSE ACCELERATION DEVICE WITH
ADJUSTABLE START STOP POINTS

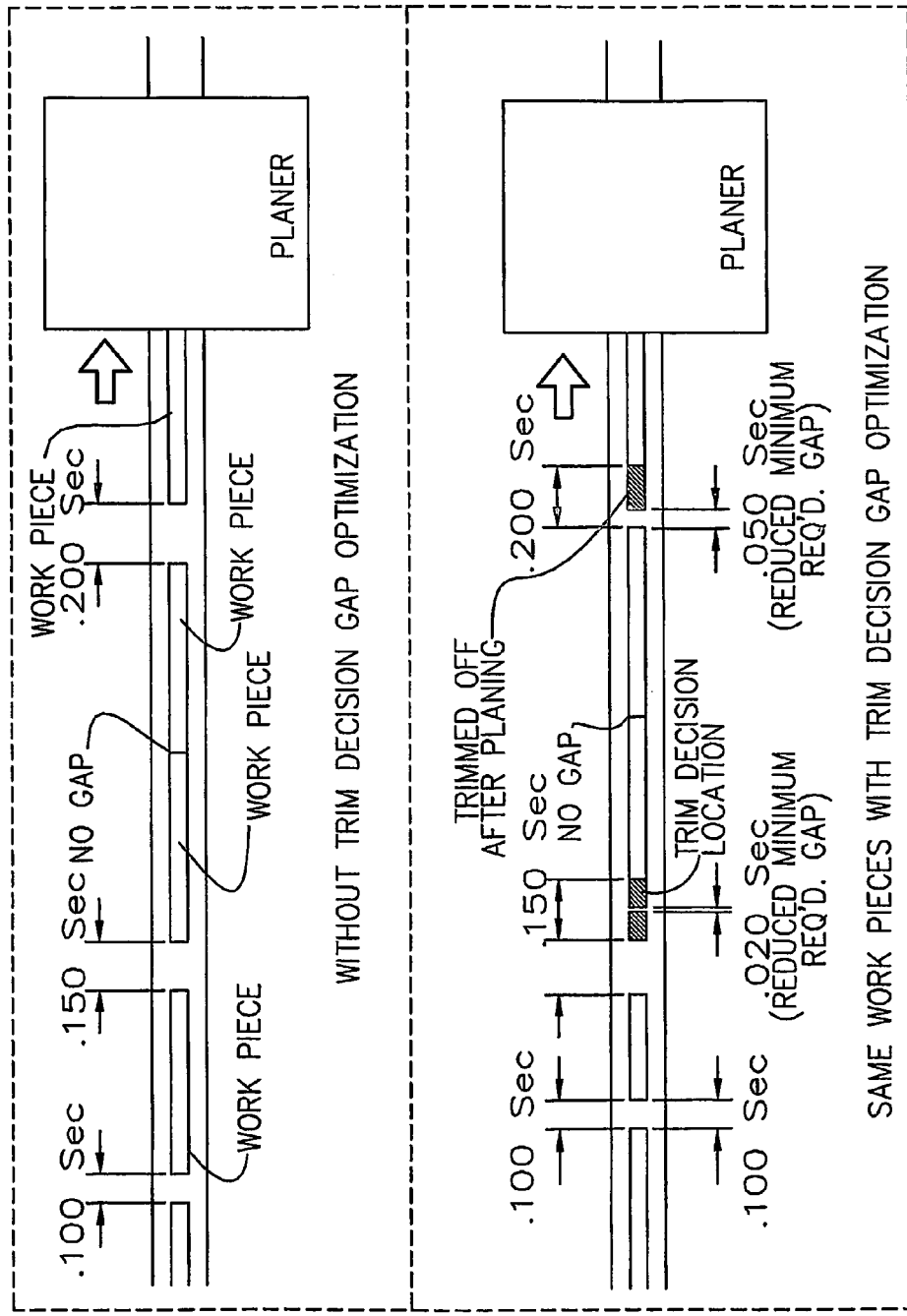

| | A | B | C | D | E | F | G | H | I | J | K | L | M | N | O | P | Q | R |
|---|---|---|---|---|---|---|---|---|---|---|---|---|---|---|---|---|---|---|
| | SHEET FEEDER | FIXED SPEED LUG TRANSFER | VARIABLE SPEED LUG TRANSFER | FIXED SPEED TAD | VARIABLE SPEED TAD | VERTICAL AD | FIXED SPEED LAD | VARIABLE SPEED LAD | FIXED SPEED ITD | VARIABLE SPEED ITD | FIXED SPEED PLANER | VARIABLE SPEED PLANER | LINEAR WPI | TRANSVERSE WPI | WPS | OLNO | CLNO | CLO |
| 1 | X | | | | | | X | | X | | X | | X | | | X | | |
| 2 | X | | | | | | X | | | X | X | | X | | X | | X | |
| 3 | X | | | | | | X | | | X | X | | X | | X | | | X |
| 4 | X | | | | | | X | | | X | X | X | X | | X | | X | |
| 5 | X | | | | | | X | | | X | | X | X | | X | | | X |
| 6 | X | | | | | | X | X | | X | | | X | | X | | X | |
| 7 | X | | | | | | X | X | | X | | | X | | X | | | X |
| 8 | X | | | | | | X | X | | | X | X | X | | X | | X | |
| 9 | X | | | | | | X | X | | | X | X | X | | X | | | X |
| 10 | X | | | | | | X | | X | X | | | X | | X | | X | |
| 11 | X | | | | | | X | | X | X | | | X | | X | | | X |
| 12 | X | | | | | | X | | | X | | X | X | | X | | X | |
| 13 | X | | | | | | X | | | X | | X | X | | X | | | X |
| 14 | X | | | | | X | X | | X | | X | | X | | | X | | |
| 15 | X | | | | | X | X | | | X | X | | X | | X | | X | |
| 16 | X | | | | | | X | X | | X | X | | X | | X | | | X |
| 17 | X | | | | | | X | X | | X | | X | X | | X | | X | |
| 18 | X | | | | | | X | X | | | X | X | X | | X | | | X |
| 19 | X | | | | | | X | | X | X | | | X | | X | | X | |
| 20 | X | | | | | | X | | X | X | | | X | | X | | | X |
| 21 | X | | | | | | X | | X | X | X | | X | | X | | X | |
| 22 | X | | | | | | X | | | X | X | | X | | X | | | X |
| 23 | X | X | | | | | X | | X | | X | | | X | X | X | | |
| 24 | X | X | | | | | X | | | X | X | | | X | X | | X | |
| 25 | X | X | | | | | X | | | X | X | | X | X | X | | | X |
| 26 | X | X | | | | | X | | | X | | X | | X | X | | | X |
| 27 | X | X | | | | | X | | | X | | X | X | X | X | | | X |
| 28 | | X | | | | | X | | | X | | | | X | X | X | | |
| 29 | | X | | | | | X | X | | X | | | | X | X | X | | |
| 30 | | X | X | | | | X | X | | X | | | | X | X | X | | |
| 31 | | X | X | | | | X | | | X | | | | X | X | X | | |
| 32 | | X | | | | | X | | X | X | | | | X | X | | X | |
| 33 | | X | X | | | | X | | X | X | | | | X | X | | X | |
| 34 | | X | | | | | X | | | X | | | | X | X | | X | |
| 35 | | X | | | | | X | | | X | | | | X | X | | | X |
| 36 | | X | X | | | | X | | | X | | | | X | X | | X | |
| 37 | | X | X | | | | X | | | X | | | | X | X | | | X |
| 38 | | X | | | X | | X | | | X | | | | X | X | | X | |
| 39 | | X | | | X | | X | | | X | | | | X | X | | | X |
| 40 | | X | | | | | | X | | X | | | | X | X | | X | |
| 41 | | X | | | | | | X | | X | | | | X | X | | | X |
| 42 | | X | | | | | X | | X | X | | | | X | X | | X | |
| 43 | | X | | | | | X | | X | X | | | | X | X | | | X |
| 44 | | X | | | | | X | | | X | | X | | X | X | | X | |

Fig. 24

CONTINUATION OF
Fig 24

| | A | B | C | D | E | F | G | H | I | J | K | L | M | N | O | P | Q | R |
|---|---|---|---|---|---|---|---|---|---|---|---|---|---|---|---|---|---|---|
| | SHEET FEEDER | FIXED SPEED LUG TRANSFER | VARIABLE SPEED LUG TRANSFER | FIXED SPEED TAD | VARIABLE SPEED TAD | VERTICAL AD | FIXED SPEED LAD | VARIABLE SPEED LAD | FIXED SPEED ITD | VARIABLE SPEED ITD | FIXED SPEED PLANER | VARIABLE SPEED PLANER | LINEAR WPI | TRANSVERSE WPI | WPS | OLNO | CLNO | CLO |
| 45 | | | X | | | | X | | | X | | X | | X | X | | | X |
| 46 | | | X | X | | | X | X | | X | | | | X | X | | X | |
| 47 | | | X | X | | | X | X | | X | | | | X | X | | | X |
| 48 | | | X | X | | | X | | X | X | | | | X | X | | X | |
| 49 | | | X | X | | | X | | X | X | | | | X | X | | | X |
| 50 | | | X | X | | | X | | | X | X | | | X | X | | X | |
| 51 | | | X | X | | | X | | | X | | X | | X | X | | | X |
| 52 | | | X | | X | | X | X | | X | | | | X | X | | X | |
| 53 | | | X | | X | | X | X | | X | | | | X | X | | | X |
| 54 | | | X | | X | | X | X | | X | | | | X | X | | X | |
| 55 | | | X | | X | | | X | X | X | | | | X | X | | | X |
| 56 | | | X | | X | | | X | X | X | | | | X | X | | X | X |
| 57 | | | X | | X | | X | | X | X | | | | X | X | | | X |
| 58 | | | X | | X | | X | | X | X | | X | | X | X | | X | |
| 59 | | | X | | X | | X | | X | | X | | | X | X | | | X |
| 60 | | X | | | X | X | | | X | | | | | X | | X | | |
| 61 | | X | | | X | X | | X | X | | | | | X | | X | | |
| 62 | | X | | | X | X | | | X | X | | | | X | X | | X | |
| 63 | | X | | | X | | X | | X | X | | | | X | X | | X | |
| 64 | | X | | | X | | X | | X | X | | | | X | X | | | X |
| 65 | | X | | | X | | X | | X | X | | X | | X | X | | X | |
| 66 | | X | | | X | | X | | X | | X | | | X | X | | | X |
| 67 | | X | | | X | X | | | X | | | | | X | X | | X | |
| 68 | | X | | | X | X | | | X | | | | | X | X | | | X |
| 69 | | X | | | X | X | | X | X | | | | | X | X | | X | |
| 70 | | X | | | X | X | | | X | X | | | | X | X | | | X |
| 71 | | X | | | X | | | X | X | X | | | | X | X | | X | |
| 72 | | X | | | X | | | X | X | X | | | | X | X | | | X |
| 73 | | X | | | X | | X | | X | X | | | | X | X | | X | |
| 74 | | X | | | X | | X | | X | X | X | | | X | X | | | X |
| 75 | | X | | | X | | X | | X | X | | X | | X | X | | X | |
| 76 | | X | | | X | | X | X | | X | | X | | X | X | | | X |
| 77 | | X | | | X | | X | X | | X | | | | X | X | | X | |
| 78 | | X | | | X | | X | X | | X | | | | X | X | | | X |
| 79 | | X | | | X | | X | | X | | | | | X | X | | X | |
| 80 | | X | | | X | | X | | X | | | | | X | X | | | X |
| 81 | | X | | | X | | X | X | X | X | | | | X | X | | X | |
| 82 | | X | | | X | | X | X | X | X | | | | X | X | | | X |
| 83 | | X | X | | | | X | | X | | | | X | | X | | X | |
| 84 | | X | X | | | | X | | | X | X | | X | | X | | | X |
| 85 | | X | X | | | | X | | | X | X | | X | | X | | X | |
| 86 | | X | | X | | | X | | | X | X | | X | | X | | X | |
| 87 | | X | | X | | | X | | | X | X | | X | | X | | | X |
| 88 | | X | | X | | | X | | | X | | X | | X | | | | X |

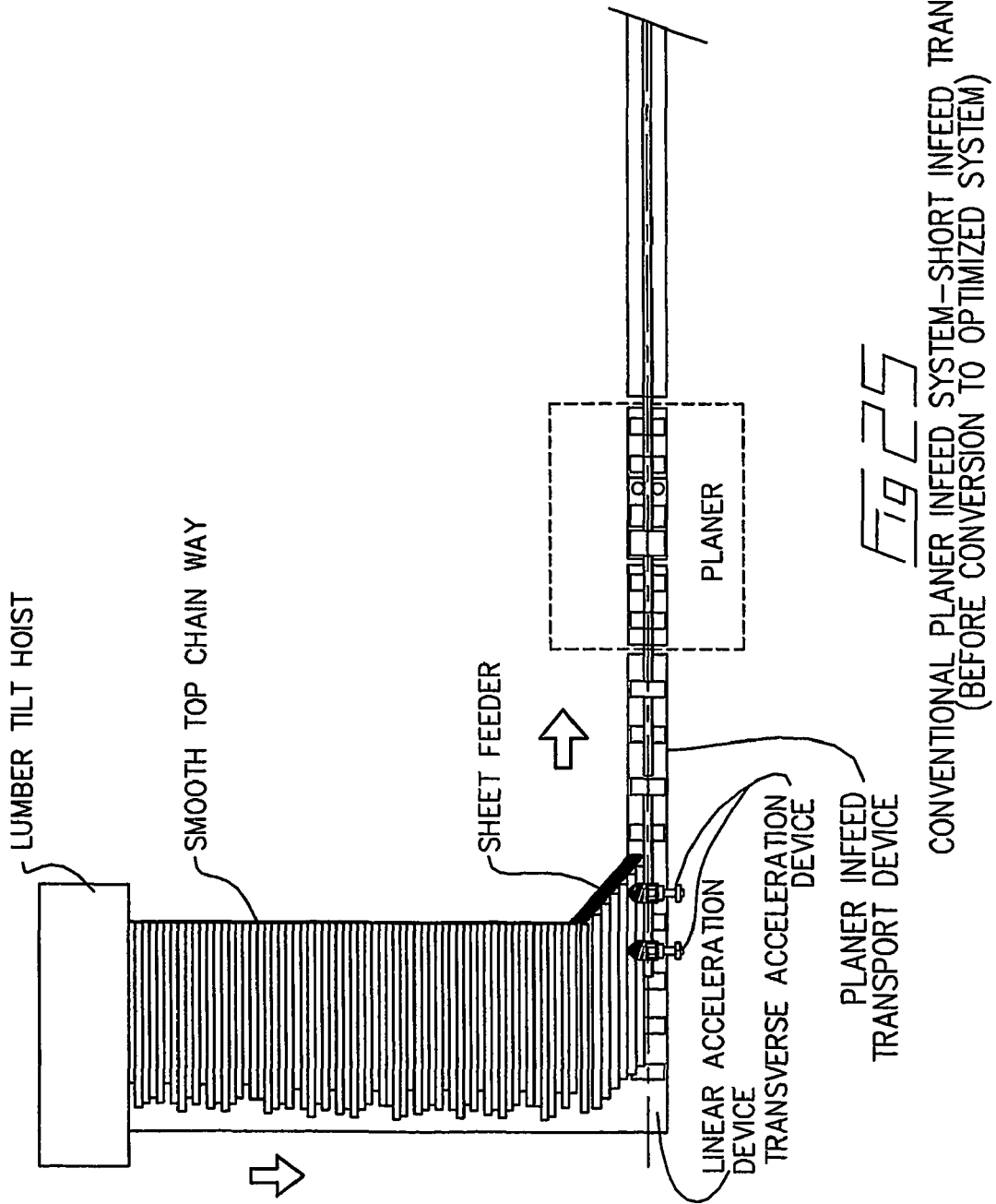

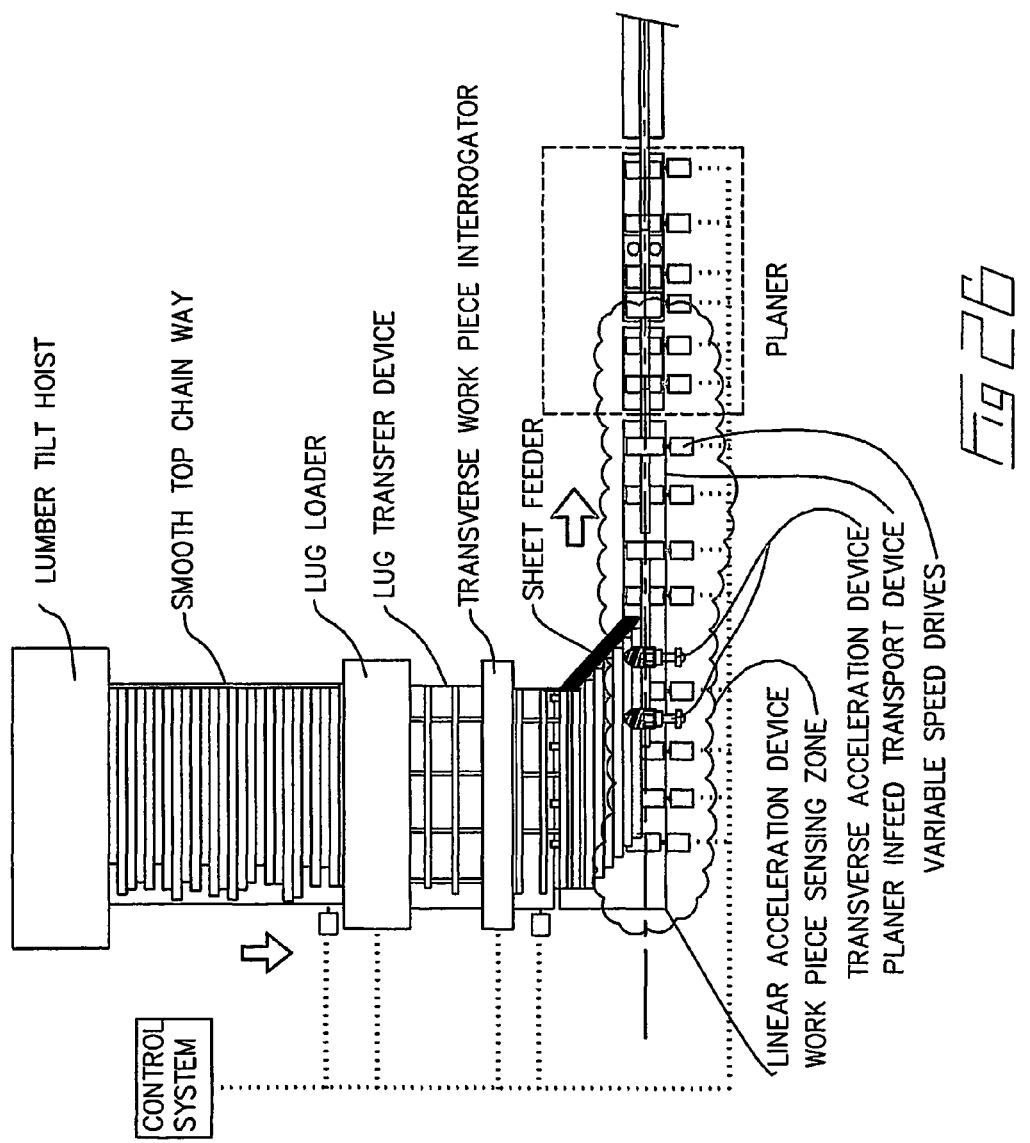

CONVENTIONAL PLANER INFEED SYSTEM—LONG INFEED TRANSPORT DEVICE
(BEFORE CONVERSION TO OPTIMIZED SYSTEM)

CONVENTIONAL PLANER INFEED SYSTEM-LONG INFEED TRANSPORT DEVICE AFTER CONVERSION TO OPTIMIZED SYSTEM)

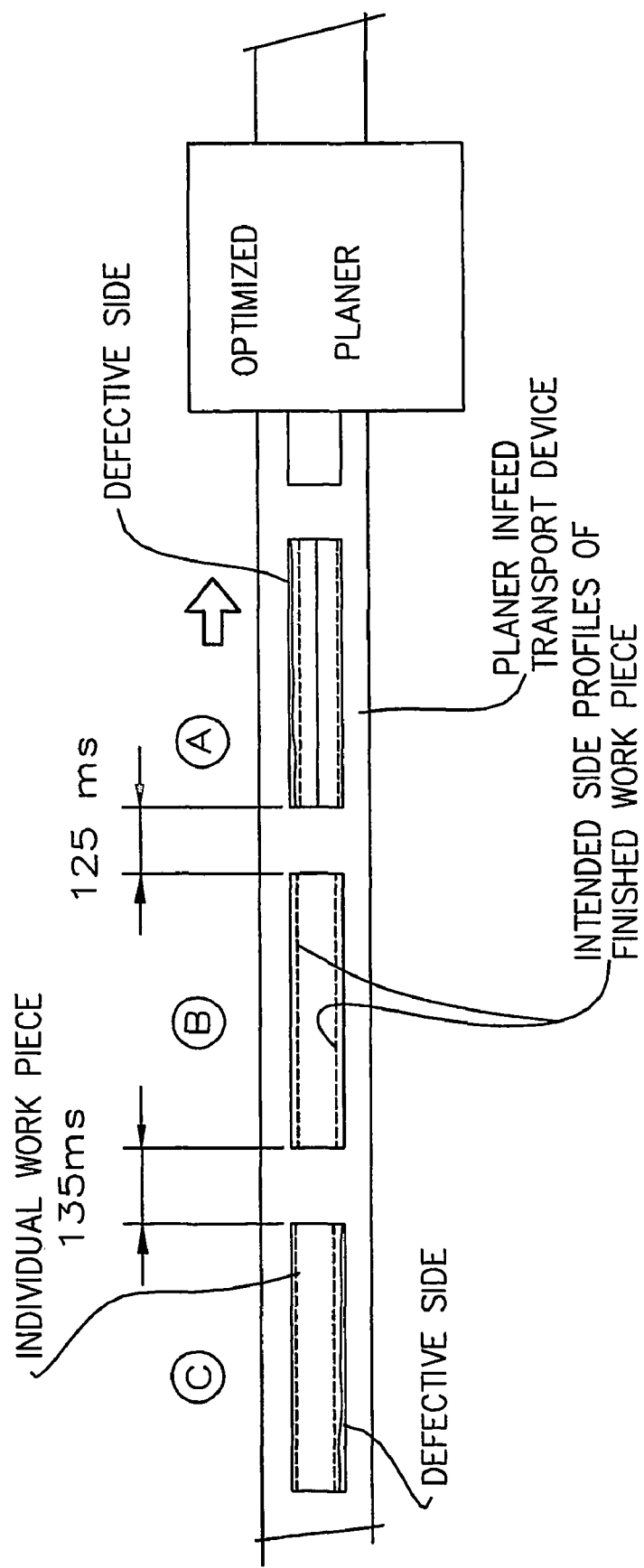

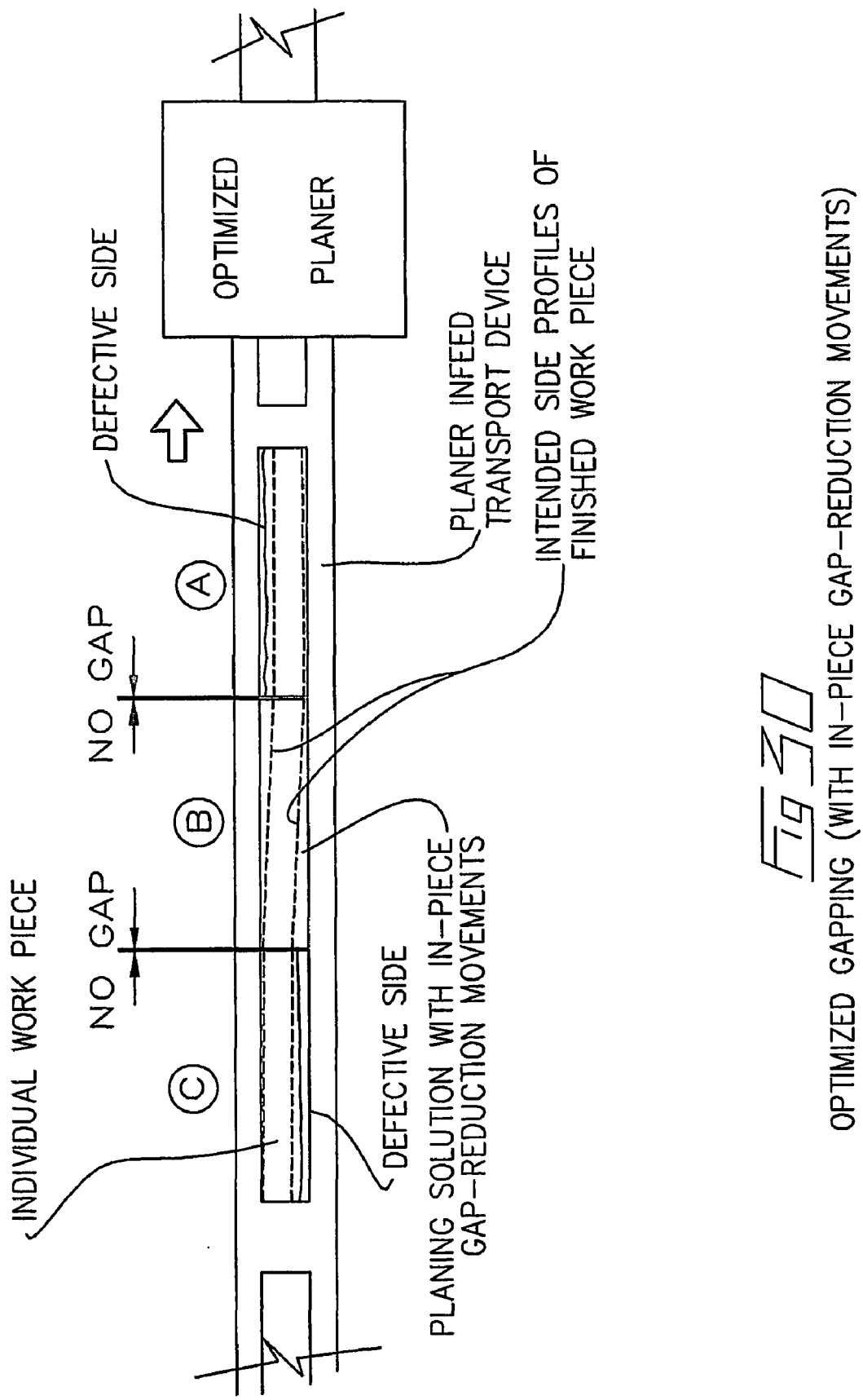

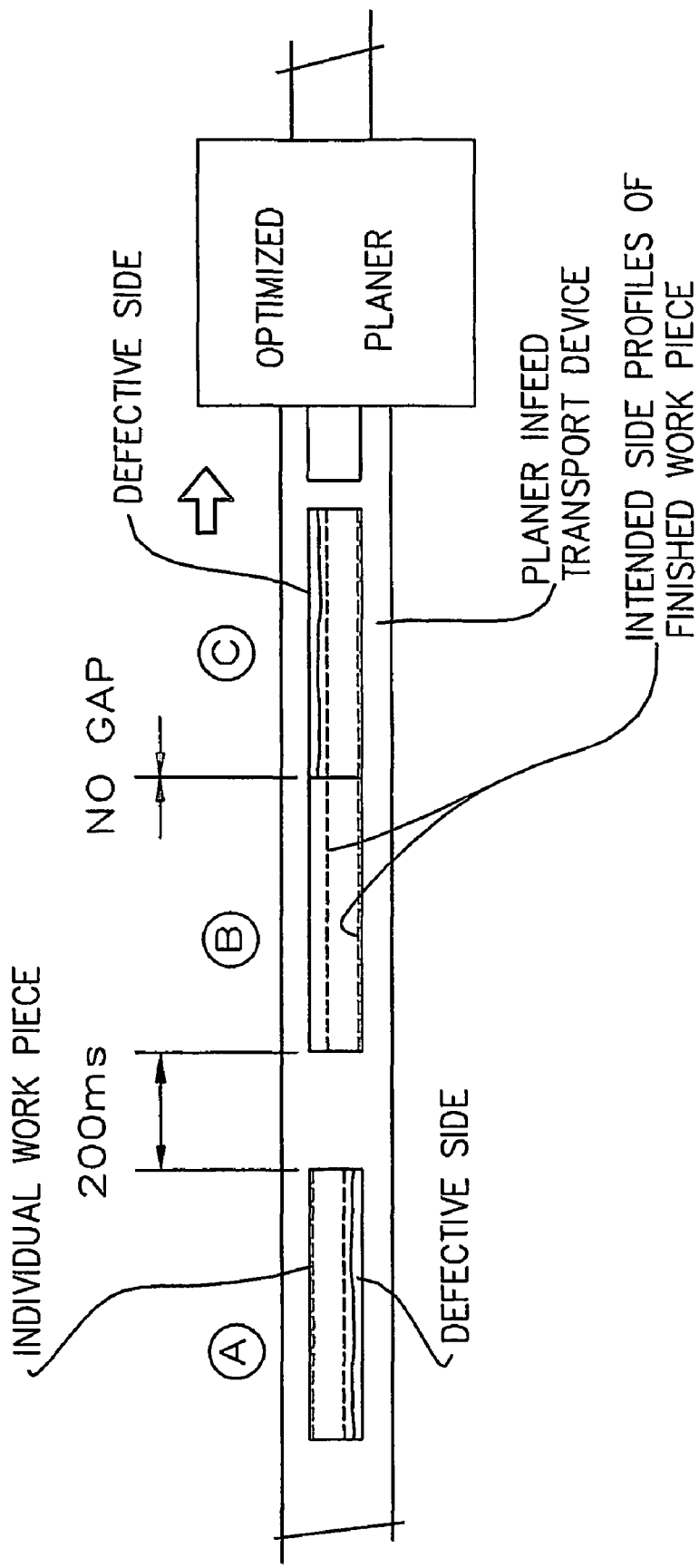

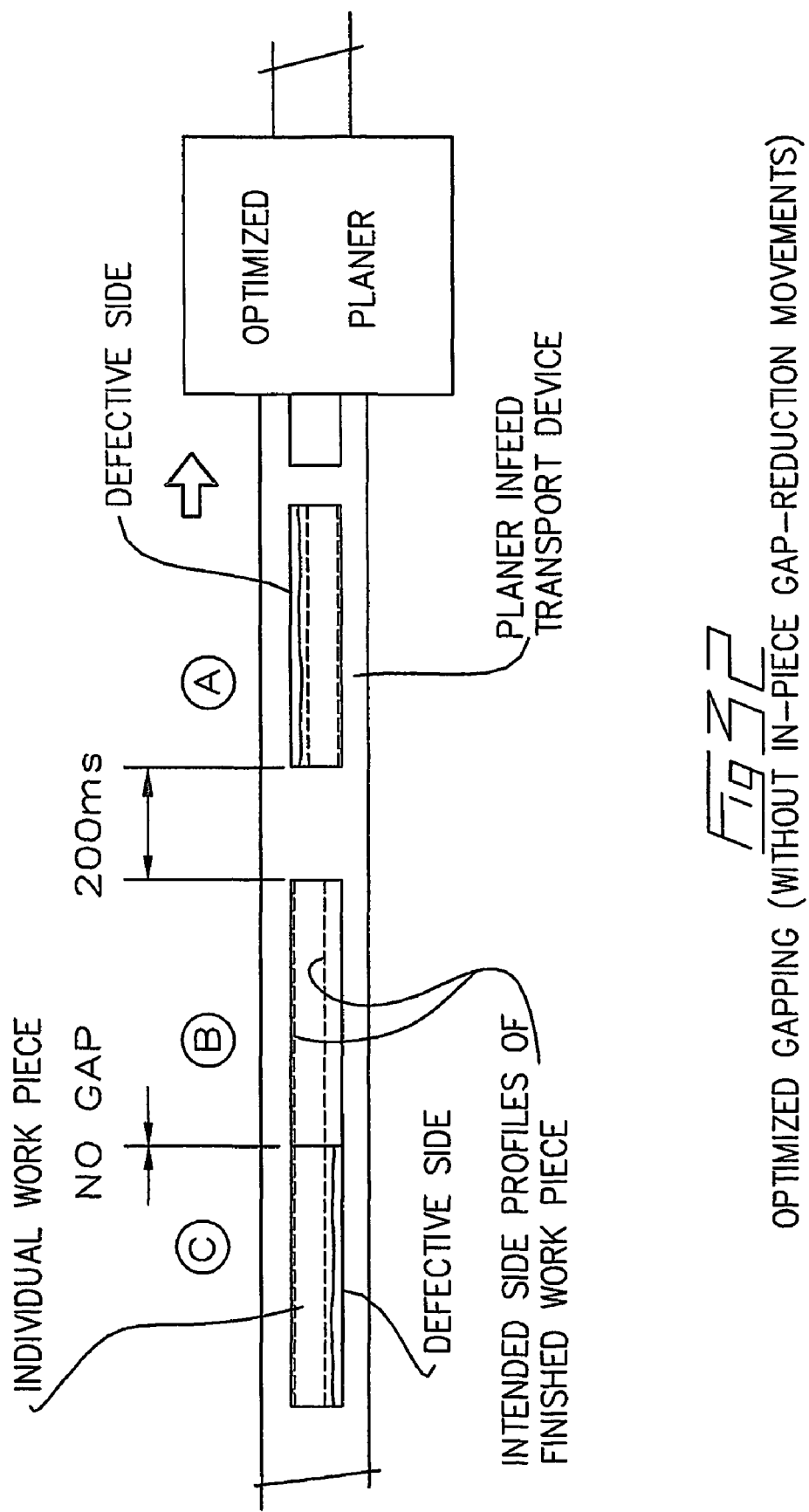

OPTIMIZING PLANER INFEED SYSTEM AND METHOD

CROSS REFERENCE TO RELATED APPLICATION

This application claims priority to PCT Application PCT/CA2004/000562, filed Apr. 14, 2004.

This invention relates to improvements in planer infeed work pieces in a planermill and in particular to an optimizing planer infeed system and method.

FIELD OF THE INVENTION

Background of the Invention

A planer, planer-matcher, or moulder are similar machines widely used throughout the wood processing industry to turn rough work pieces into finished work pieces such as surfaced lumber and contoured shapes like molding, flooring and siding. The planer's primary function is to produce a finished piece with the desired cross-sectional profile and an adequate surface finish from the rough work piece being processed.

FIG. 1 shows a diagram of the typical flow of material through a conventional prior art planer system. The rough work piece is typically fed transversely on a smooth transfer deck and sheet fed into a 90° turn called a linear acceleration device onto the planer infeed transport device. The work pieces then typically feed linearly into the planer with little or no gap between each piece.

The key elements of a typical prior art planer infeed system, as shown in FIG. 1, are as follows:
  a) lumber tilt hoist
  b) smooth top chain way
  c) sheet feeder
  d) linear acceleration device
  e) transverse acceleration device
  f) planer infeed transport device
  g) planer The exact configuration and name given to each component of the infeed system may change based on manufacturer, model and the material being processed.

An optimizing planer system is a recently developed device where a geometric scanning system measures the dimensional profile of each individual incoming rough work piece. The profile data of each incoming piece is then used during the planing operation to control the planer to produce the most optimized finished work piece. In an optimizing planer system the planer must have sufficient gaps present between each work piece so that the positioning devices within in the planer have enough time to properly reset from one piece to the next.

SUMMARY OF THE INVENTION

The invention centers on the recognition that the throughput of an optimizing planer is highest if the gap time between each individual work piece can be controlled. Preferably, this gap time should be held to the minimum required gap time (the time required for guiding and/or cutting elements within a planer to reposition between work pieces) for the type of planer feeding system and control system being used. Gap control is achieved through combining mechanical systems with one or more of the following: scanning, sensing, computer optimization and computer process control systems.

There are basically three different practical methods of establishing and/or controlling and/or correcting the gap time between individual work pieces in an optimizing planer infeed system. These three methods are: open-loop, non-optimizing gap control, closed-loop non-optimizing gap control, and closed-loop optimized gap control.

Open-loop, Non-optimizing Gap Control

The first method of gap control is open-loop, non-optimizing control. This method involves knowing the minimum required gap associated with the mechanical constraints of the planer (the time it takes to move the guiding and cutting elements their farthest amount) then setting the gap between work pieces with fixed time base open loop control. Fixed time base open loop control is defined as a system having a fixed speed (meaning the speed is not automatically varied over time for the purpose of establishing and/or controlling and/or correcting the gap between work pieces). For example, if it is known that the minimum required gap for a given planer is 0.125 seconds, then the mechanical system feeding the planer would release the work pieces to feed into the planer with a 0.125 second plus a safety factor time of possibly 0.050 seconds gap between pieces. This method of gap control relies only on mechanical time based gapping. No work piece sensing, computer optimization or computer process control are required for this method. Once the work pieces are gapped, there is no automatic gap monitoring or correction.

Closed-loop, Non-optimizing Gap Control

The second method of gap control is closed loop, non-optimizing control. This method also involves knowing the minimum required gap time associated with the mechanical constraints of the planer (the time it takes to move the guiding and/or cutting elements their farthest amount) and establishing and/or controlling and/or correcting the gap between work pieces with variable time based closed loop control. Variable time based closed loop control is defined as a system having a variable speed (meaning the speed is automatically varied over time for the purpose of establishing and/or controlling and/or correcting the gap between work pieces). For example, if it is known that the minimum required gap for a given planer is 0.125 seconds then the closed loop controlled mechanical system controls the planer infeed devices to establish and/or control and/or correct the gap to a target of 0.125 seconds between subsequent work pieces as they enter the planer. This method of gap control relies on one or more of the following, variable time based control as described above, work piece sensing, and computerized process control.

Closed-loop, Optimizing Gap Control

The third method of gap control is closed loop, optimizing control. This method involves determining the minimum required gap time from one individual work piece to the next individual work piece based upon predicting and/or calculating the actual time required to reposition the guiding and/or cutting elements within the planer between these work pieces, then establishing and controlling and/or correcting the gap between work pieces accordingly based upon this information. For example, if only a short repositioning movement is required between work pieces (0.025 seconds for example) then only a small gap would be established and/or controlled and/or corrected between those two incoming work pieces (a gap time of 0.025 seconds plus a safety factor). Alternatively, if a lengthy repositioning of guiding and/or cutting elements is anticipated between pieces (0.200 seconds for example) then a longer corresponding gap would be established and/or controlled and/or corrected between work pieces. This method of gap control relies on one or more of the following, variable time base control, work piece sensing, computerized process control, and computer optimization. This method of controlling the gap between work pieces is called fully optimized gap control. FIG. 2 shows a simplified example of this method.

Other gap control methods are conceivable, but they may not be as desirable and/or as practical as the three methods outlined above. For example, an optimizing planer infeed system could employ open-loop optimizing gap control where the minimum required gap time is determined from one individual work piece to the next individual work piece based upon predicting and/or calculating the actual time required to reposition the guiding and/or cutting elements between each work piece within the planer (just as in the previously described method, closed loop, optimizing control) then, simply establishing the gap between work pieces accordingly based upon this information—without controlling and/or correcting the gap over time.

In summary, the optimizing planer infeed system according to the present invention, for feeding an array of workpieces linearly downstream to a planer, includes means for setting the size of gaps between successive workpieces so that each gap between successive workpieces provides enough time for at least one of: (a) movable cutting elements or at least one cutting element (collectively herein referred to as cutting elements) in the planer; and (b) acting guiding elements to be moved to their optimized position corresponding to the next successive workpiece. The description of the cutting element being moved relative to the workpiece is expressly intended to encompass the relative movement of the workpiece, relative to the cutting element, for example moved by an active guiding element. In one aspect of the present invention each gap is optimized individually so that the gap spacing provides only enough time for the individual optimization of the next successive workpiece in the array of workpieces, so as to not waste time.

The means for setting the size of gaps may include a workpiece feed path means for translating the array of workpieces downstream towards the planer, and means for accelerating workpiece speed of the workpiece along, and cooperating with, the workpiece feed path means so as to control the size of the gaps. The size of the gaps may include wood to be trimmed downstream in a trimmer according to an optimized trim solution. Further workpiece transportation means such as an intermediate transport device may be provided for transporting the workpiece downstream from the means for accelerating workpiece speed to the planer. Workpiece interrogation means may be provided for interrogating the workpiece to determine workpiece data corresponding to attributes of the workpiece, in which case a workpiece optimization system may be provided that receives the workpiece data corresponding to attributes of the workpiece from the workpiece interrogation means, determines an optimized cutting solution for the workpiece, and sends control instructions to the means for accelerating workpiece speed.

The means for accelerating workpiece speed may include one or more of a fixed speed transverse acceleration device, a variable speed transverse acceleration device, a vertical acceleration device, a fixed speed linear acceleration device, a variable speed linear acceleration device. The workpiece interrogation means may include one or more of a linear workpiece interrogator and a transverse workpiece interrogator. The workpiece transportation means may include one or more of a fixed speed intermediate transport device, a variable speed intermediate transport device. The workpiece feed path may include one or more of a sheet feeder, a fixed speed lug transfer and a variable speed lug transfer.

The apparatus according to the present invention may further include workpiece sensing means to sense one or more of the position, velocity and acceleration of a workpiece in the array of workpieces upstream of the planer; and a control system that receives data from the workpiece sensing means and using the data from the workpiece sensing means, controls the size of the gaps to establish and/or control and/or correct a minimum required gap between each successive workpiece. In one embodiment the control system and the workpiece optimization system are combined into a singular gap optimization system.

Means may be provided for determining in-piece gap-reduction for a successive series of workpieces in the array of workpieces. The means for setting the size of gaps between successive workpieces cooperates with the means for determining in-piece gap-reduction so as to reduce the size of gaps. An optimized planing solution for a downstream workpiece in the successive series of workpieces provides for in-piece setting of the cutting elements within the downstream workpiece so as to pre-position the cutting elements for commencing an optimized planing solution for a next adjacent upstream workpiece in the successive series of workpieces. The size of gap between the downstream and upstream workpieces may thereby be reduced, for example, to zero.

The method of optimizing the infeed to an optimizing planer according to the present invention may include the steps of feeding a series of workpieces downstream towards the planer; accelerating each workpiece in the series of workpieces to provide a gap and corresponding time between successive workpieces in the series sufficient for optimized setting of cutting elements in the planer. The method may further include the steps of: interrogating each workpiece and creating unique workpiece property information corresponding to the workpiece; transporting each workpiece to the planer; and controlling the cutting operation of the planer for each the workpiece based upon the workpiece property information corresponding to the workpiece.

The method may also include sensing one or more of the position, velocity and acceleration of a workpiece as the workpiece is fed or transported downstream to the planer and collecting corresponding data therefrom; and controlling the acceleration of each workpiece to establish and/or control and/or correct a minimum required optimized gap of the workpieces.

The method may also include the steps of:

(a) determining in-piece gap-reduction for a successive series of workpieces in the array of workpieces, wherein the means for setting the size of gaps between successive workpieces cooperates with the means for determining in-piece gap-reduction so as to reduce the size of gaps, and (b) determining a corresponding optimized planing solution for a downstream workpiece in the successive series of workpieces thereby providing for in-piece setting of the cutting elements within the downstream workpiece so as to pre-position the cutting elements for commencing an optimized planing solution for a next adjacent upstream workpiece in the successive series of workpieces, whereby the size of gap between the downstream and upstream workpieces is reduced.

BRIEF DESCRIPTION OF THE DRAWINGS

FIG. 16 is, in side elevation view, a sheet fed vertical acceleration device.

FIG. 23 is, in plan view, an example of an optimized planer infeed system with fully optimized gap control, shown with and without the addition of trim decision gap optimization.

FIG. 24 is a matrix showing combinations of planer infeed component devices that may be set up and controlled to operate as gapping infeed systems.

FIG. 25 is, in plan view, a conventional prior art planer infeed system with a short infeed transport device.

FIG. 26 is, in plan view, the planer infeed system of FIG. 25 after conversion to an optimized system.

FIG. 29 is, in diagrammatic plan view, an example of optimized gapping, without in-piece gap-reduction movements.

FIG. 30 is, in diagrammatic plan view, an example of optimized gapping, within-piece gap-reduction movements.

FIG. 31 is, in diagrammatic plan view, an alternative example of optimized gapping, without in-piece gap-reduction movements, and showing two work pieces with no gap between them.

FIG. 32 is, in diagrammatic plan view, a further alternative example of optimized gapping, without in-piece gap-reduction movements, and showing two work pieces with no gap between them.

DETAILED DESCRIPTION OF EMBODIMENTS OF THE INVENTION

Figure 1:
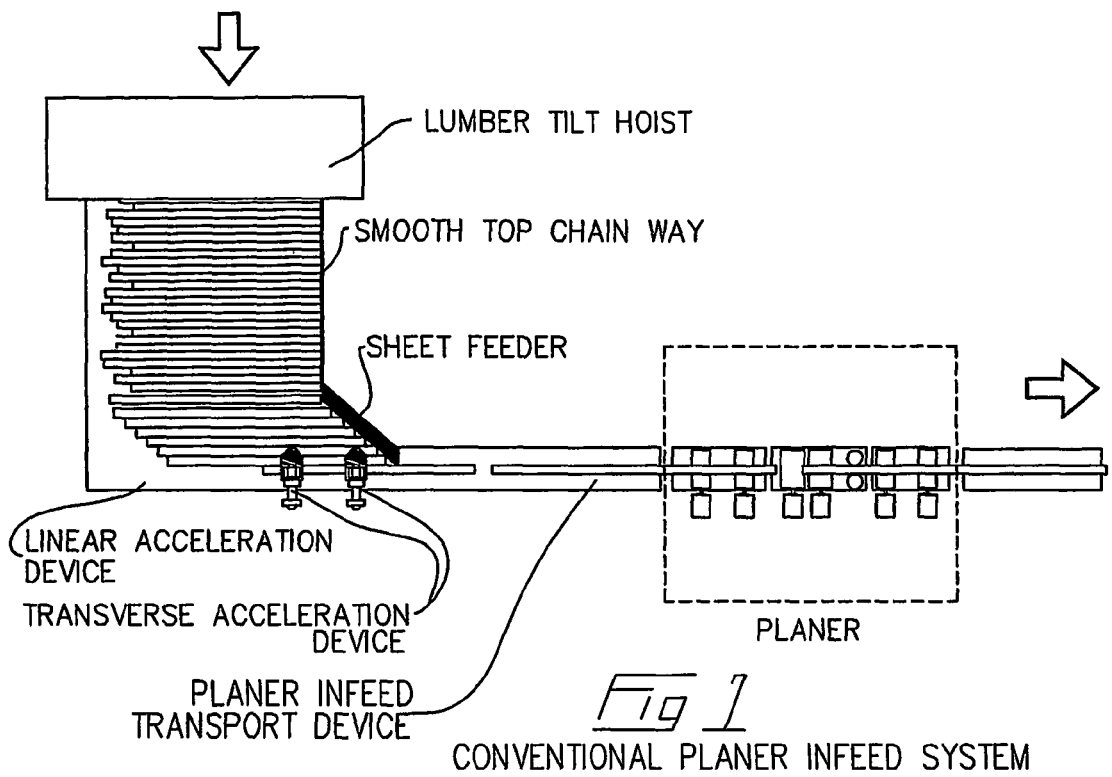
FIG. 1 is, in plan view, a prior art planer infeed configuration.
Figure 2:
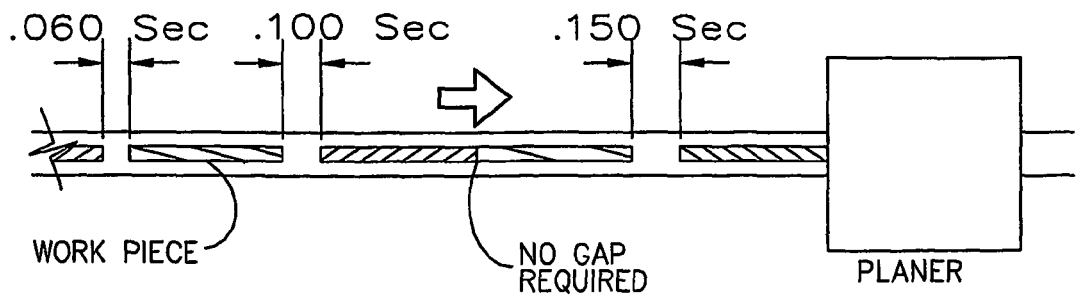
FIG. 2 is, in plan view, a simplified example of an optimized planer infeed system showing fully optimized gap control.

FIGS. 3 through 8 show various planer feeding system configurations that utilize different combinations of mechanical, sensing, process control and optimization to establish and/or control and/or correct the gap, i.e., the minimum required gap between work pieces. These systems are a combination of some or all of the following subsystems:

| | |
|---|---|
| 1 | Work piece sensing |
| 2 | Computerized process control system |
| 3 | Work piece optimization system |
| 4 | Gap optimization system |
| 5 | Tilt hoist |
| 6 | Smooth transfer deck |
| 7 | Lug loader |
| 8 | Fixed speed lug transfer |
| 9 | Variable speed lug transfer |
| 10 | Transverse work piece interrogator |
| 11 | Sheet feeder |
| 12 | Fixed speed transverse acceleration device |
| 13 | Variable speed transverse acceleration device |
| 14 | Fixed speed linear acceleration device |
| 15 | Variable speed linear acceleration device |
| 16 | Vertical acceleration device |
| 17 | Linear work piece interrogator |
| 18 | Fixed speed planer infeed transport device |
| 19 | Variable speed planer infeed transport device |
| 20 | Fixed speed planer |
| 21 | Variable speed planer |

As used herein, the referenced numerals above denote corresponding elements in each of the views forming part of this invention.

Work Piece Sensing (1)

Work piece sensing is the sensing of the work pieces position and/or velocity and/or acceleration as the work piece is being processed through the entire optimizing planer system. Examples of work piece sensors may include, photo electric cells, photo proximity devices, laser based distance meters, laser interferometers, sonar devices, ultrasound devices, vision systems including CCD array cameras, encoders, light curtains, Doppler Effect devices and contact devices.

Commputerized Process Control System (2)

Computerized process controls are any type of controls or control system that can receive data from work piece sensing devices and use this data to control the devices in the optimized planer system in such a manner to establish and/or control and/or correct the minimum required gap of the work pieces being processed through the particular optimized planer system being controlled. Examples of these control systems may include programmable logic controllers, personal computers, mini computers, embedded electronics, motion control systems, and any combination of these devices.

Work Piece Optimization System (3)

Work piece optimization system is the system that receives work piece physical characteristic data from the transverse and or linear work piece interrogator and determines the optimum planing or trimming solution for each individual work piece. The computerized process control system may be combined with the work piece optimization system in one computer or processing device and to perform all the necessary computations to fully control the optimized planer line.

Gap Optimization System (4)

A gap optimization system is the combination of the work piece sensing and the computer software programs that do the necessary computation in order to establish and/or control and/or correct the minimum required gap between work pieces being fed into the planer.

Tilt Hoist (5)

The tilt hoist is a device that takes a unit or stack of rough work pieces and delivery them onto the smooth transfer deck in basically a sheet of work pieces.

Smooth Transfer Deck (6)

The smooth transfer deck carries the sheet of work pieces to other devices in the planer infeed system. The smooth transfer deck is usually made up of multiple strands of smooth top chain running in troughs spaced along the length of the sheet of work pieces providing support and transportation for the work pieces.

Lug Loader (7)

The lug loader is used to take the work pieces from the sheet of work pieces on the smooth transfer deck and place them into lug spaces on either a fixed or variable speed lug transfer.

Fixed Speed Lug Transfer (8)

A fixed speed lug transfer is a conveyor made up of numerous strands of chain with lugs attached at fixed intervals to push the work piece ahead and keep the work pieces singulated (traveling separately). The speed of this fixed speed lug transfer is set manually and is not varied automatically by the process control system to control and/or correct the gap between work pieces.

Variable Speed Lug Transfer (9)

Figure 9:
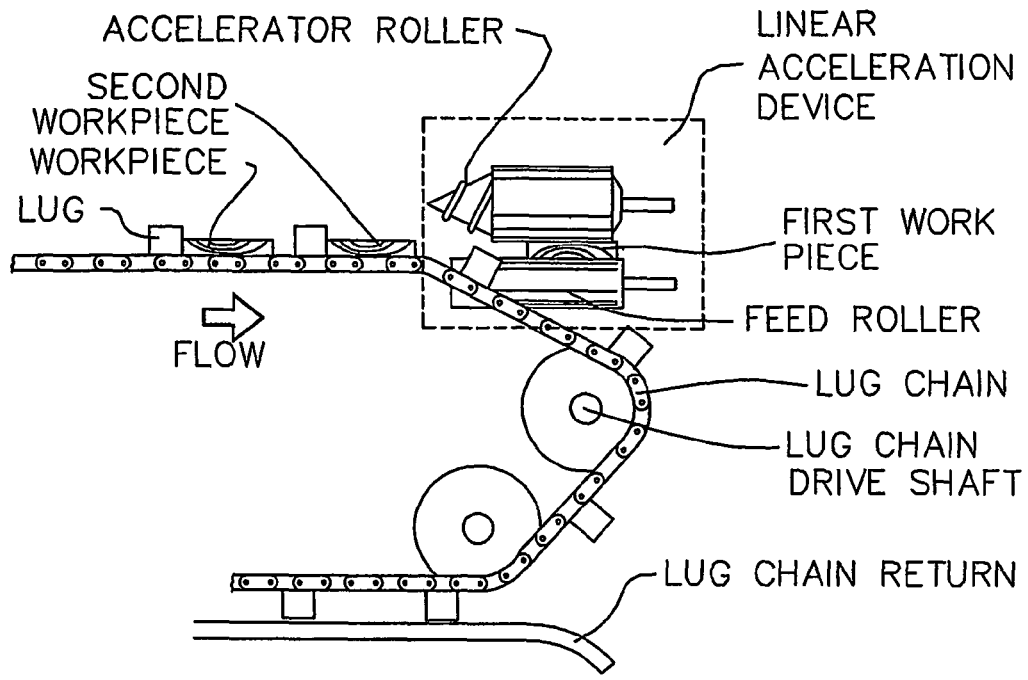
FIG. 9 is, in side elevation view, a lug transfer device feeding work pieces onto a linear acceleration device.

A variable speed lug transfer is the same as the fixed lug transfer except that in addition to controlling the speed manually, the process control system may automatically vary the speed to establish and/or control and/or correct the gap between work pieces. The lugs on either the fixed speed or variable speed lug transfer may be roller lugs. FIG. 9 shows a fixed speed or variable speed lug transfer device feeding work pieces onto a linear acceleration device, i.e., an accelerator which accelerates a workpiece linearly along its longitudinal axis.

Transverse Work Piece Interrogator (10)

A transverse work piece interrogator may be conventional geometric scanning equipment that uses lasers to measure the geometric characteristics of each work piece. Other transverse work piece interrogators may be used to detect the incoming work piece's properties to control the gapping of the work pieces. Examples of such work piece interrogators may include, vision systems, ultrasonic based geometric scanners, moisture meters, x-ray sensors, dielectric sensors, density sensors, and contacting thickness gauges. These alternative work piece interrogators may be used separately, in combination with each other, or in combination with conventional laser based geometric scanners. These alternative instruments may detect work piece geometry, defect information, or other relevant data that could be used to most optimally control the gap of each individual work piece. Examples of measured properties besides geometric data include, grain geometry, knot geometry and physical properties, surface finish, density, moisture content, and color variation.

Sheet Feeder (11)

Figure 10:
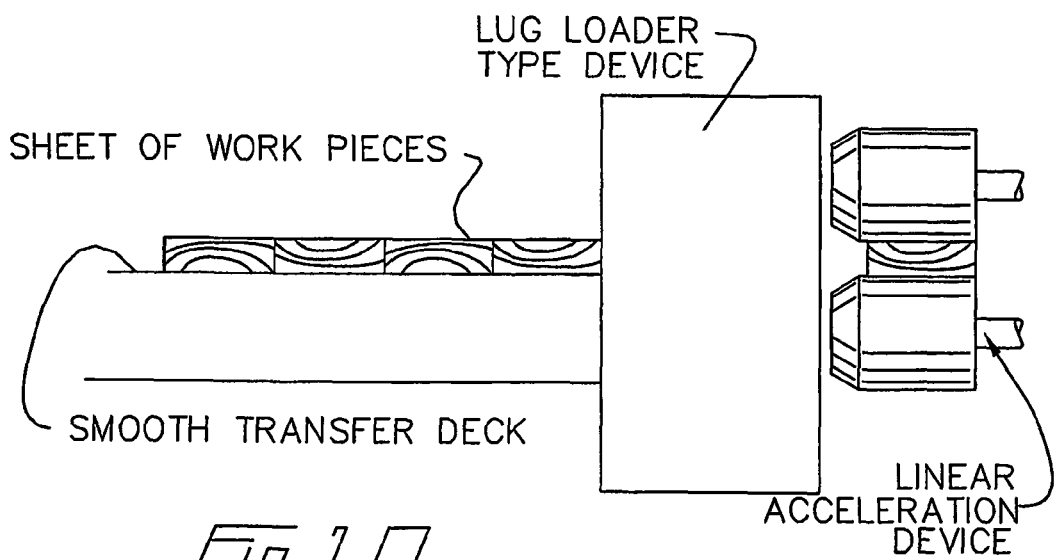
FIG. 10 is, in side elevation view, a lug loader-type device sheet feeder.
Figure 11:
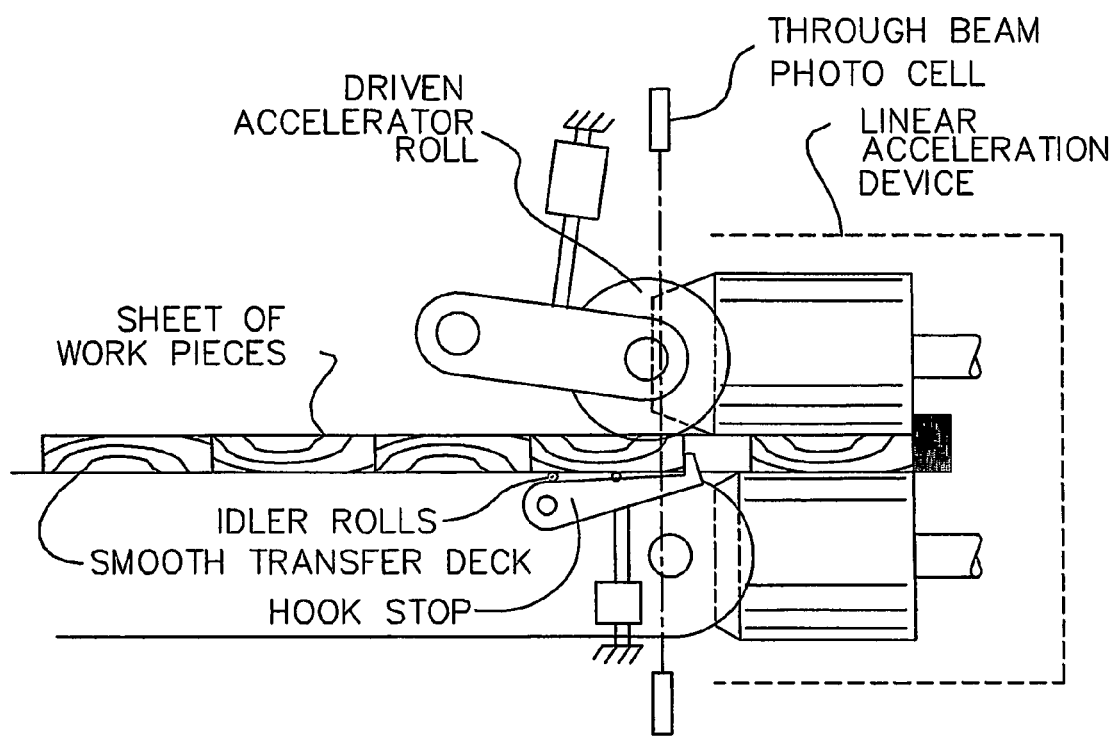
FIG. 11 is, in side elevation view, a sheet feeder.

FIG. 10 shows one embodiment of a sheet feeder. A sheet feeder is any device that deals or feeds work pieces one at a time from a sheet of work pieces substantially butted together along the lengthwise edge of each work piece onto an accelerator such as a transverse acceleration device for accelerating a workpiece transversely relative to its longitudinal axis, a vertical acceleration device which translates vertically into engagement with a workpiece and which may accelerate the workpiece vertically, typically orthogonally to its longitudinal and transverse axes, a hopper feeder, or a linear acceleration device. The sheet feeder shown in FIG. 11 is comprised of a hook stop used in conjunction with an overhead transverse accelerator roll. In this example, the sheet feeder is controlled by the computerized process control system to feed work pieces one at a time onto the linear acceleration device, wherein the sheet feeder is controlled by the process control system using information received from the through-beam photo electric cell to detect the leading and trailing edges of the work pieces. There may be many variations of this sheet feeder device as would be apparent to one skilled in the art. Without intending to be limiting, examples of alternative sheet feeders are shown in FIGS. 12 through 16.

Figure 12:
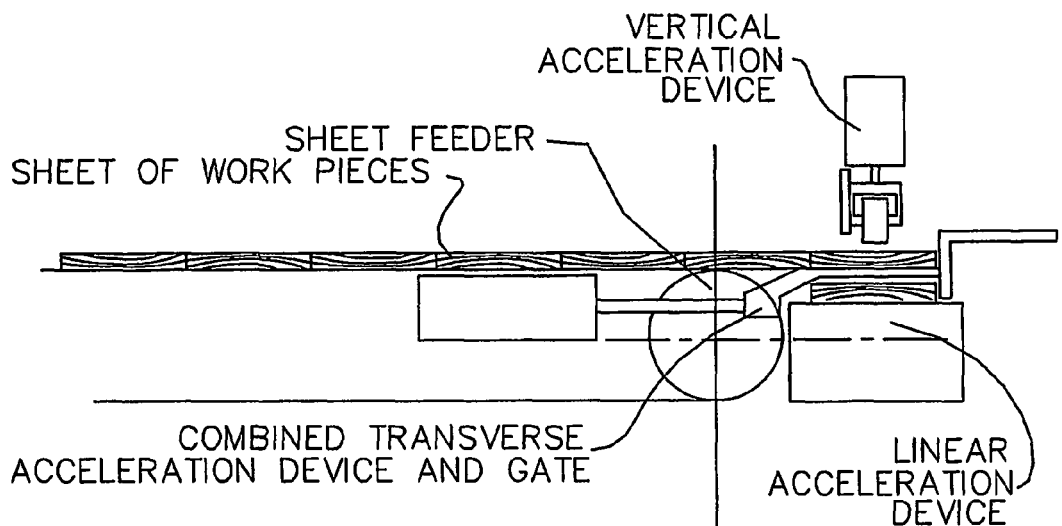
FIG. 12 is, in side elevation view, a sheet fed transverse acceleration device combined with a vertical acceleration device and a linear acceleration device.
Figure 12A:
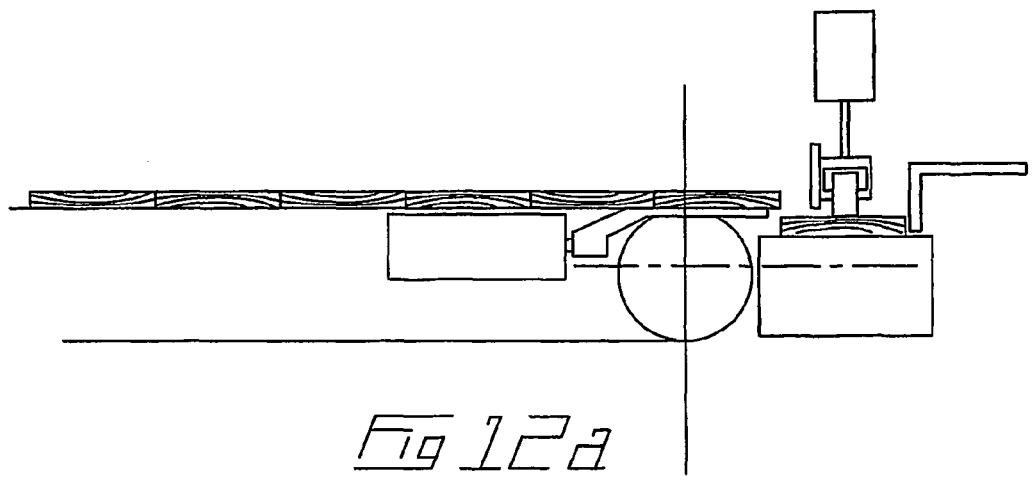

The sheet feeder in FIG. 12 feeds the work piece over the top of the piece being accelerated on the linear acceleration device. In this example, the sheet of work pieces is advanced towards the linear acceleration device as the previous work piece is being accelerated. The next work piece is in position and ready to be dropped or forced down against the linear acceleration device. This method of sheet feeding basically uses a vertical acceleration device to move the work piece from the sheet to the linear acceleration device. This method may have advantages over methods that use more traditional acceleration devices because of the shorter maximum distance the work piece must move from its position in the sheet to the linear acceleration device. This advantage may be greater with wider work pieces.

Figure 13:
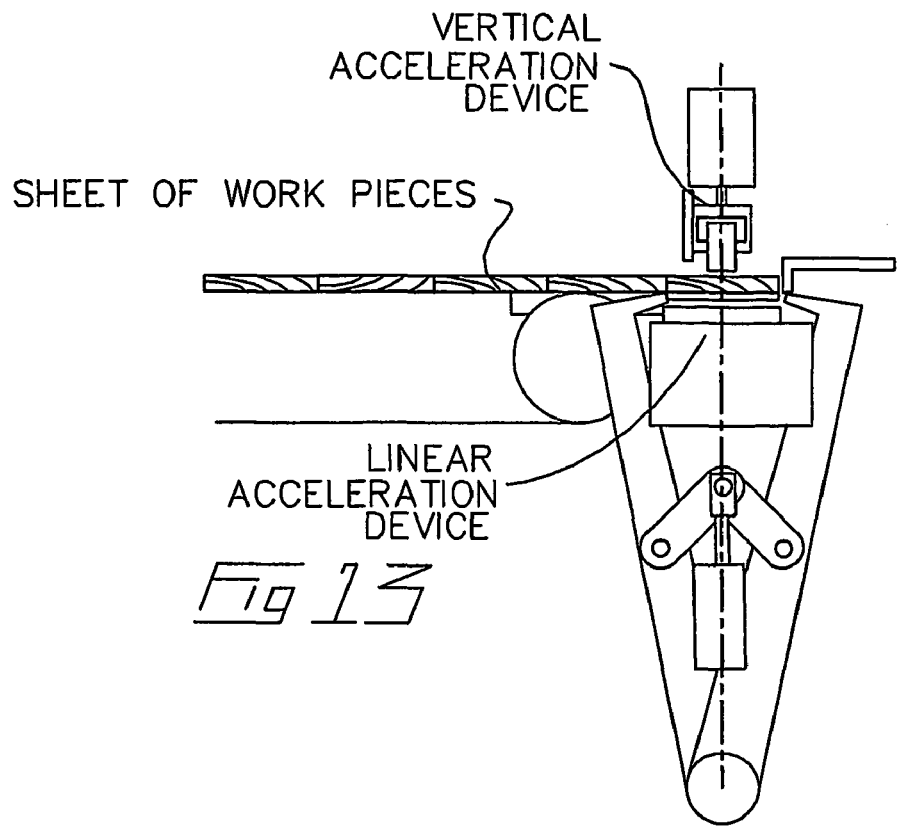
FIG. 13 is, in side elevation view, an alternative embodiment of a sheet fed transverse acceleration device combined with a vertical acceleration device and a linear acceleration device.
Figure 13A:
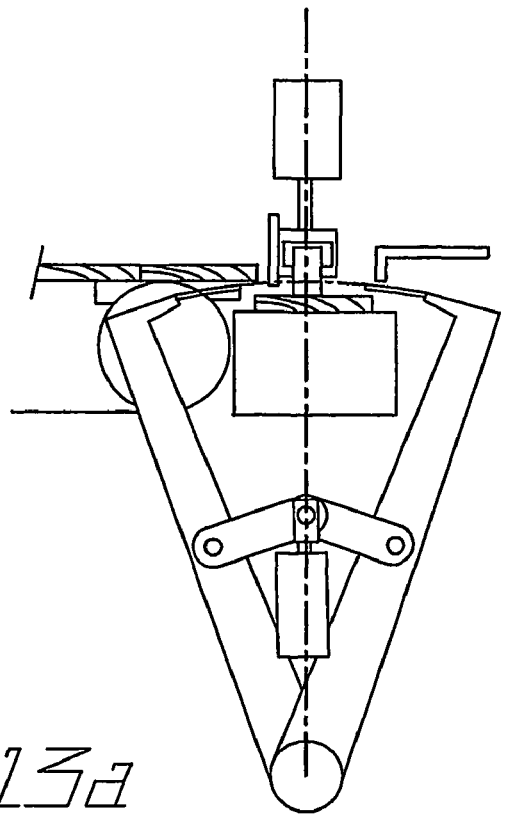

FIG. 13 shows another example of a sheet feeder used in conjunction with a vertical acceleration device. In this example the method by which the incoming work piece is supported above the work piece on the linear acceleration device is different than that of the example shown previously in FIG. 12 in that this hold-up device retracts from the center out instead of from one side out.

Figures 15A, 15B:
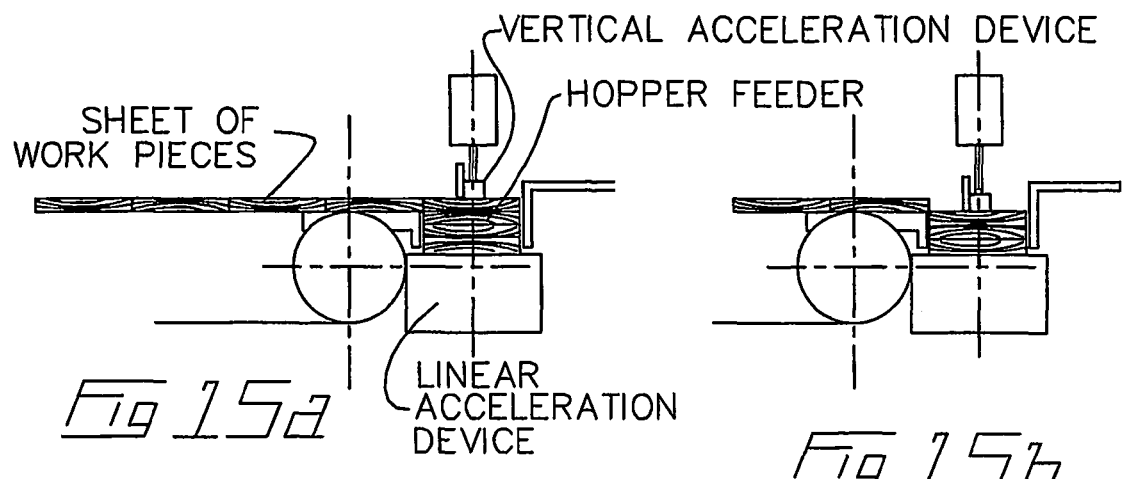
FIG. 15 is, in side elevation view, a sheet fed hopper feeder device.
Figure 15C:
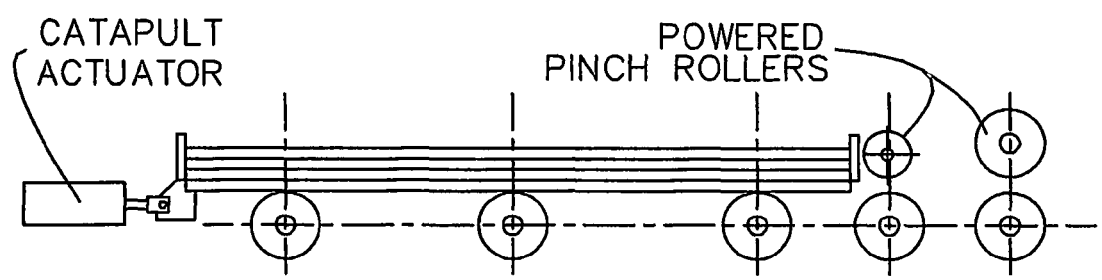
Figure 15D:
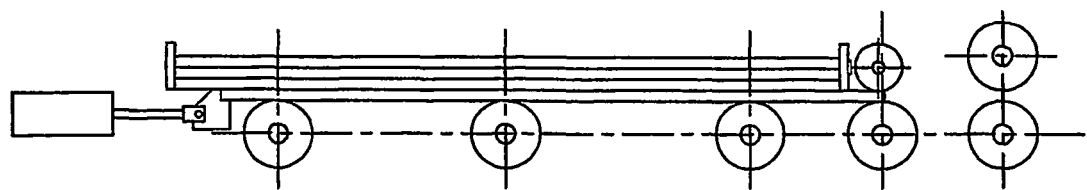

FIG. 15 shows an alternative sheet feeder device. In this example the sheet of work pieces advance a single work piece over a hopper feeder. The hopper has multiple work pieces stacked vertically above a linear acceleration device. This particular linear acceleration device is a catapult type. In this example, the work piece on the linear acceleration device is sitting on a roller bed of non driven rollers. The catapult cylinder shown at the far left end of the work piece pushes the work piece forward (right as shown) far enough for the work piece to be engaged by a pair or multiple pairs of driven pinch rollers. These pinch rollers basically grab the work piece and accelerate it out of the hopper. The work piece that was positioned next in the stack now falls by gravity or is assisted with a vertical acceleration device down onto the roller bed of the linear acceleration device in position to be catapulted into the powered pinch rollers. The sheet feed advances the next work piece into the hopper as the work piece on the roller bed is being catapulted into the powered pinch rollers. It can be imagined that this sheet feeder/vertical hopper could be thought of as work pieces in a lug transfer with the lug space being the thickness of the work pieces. Work pieces accelerating out of a sheet fed hopper system may be capitulated transversely directly onto a linear acceleration device.

Fixed Speed Transverse Acceleration Device (12)

Figure 17:
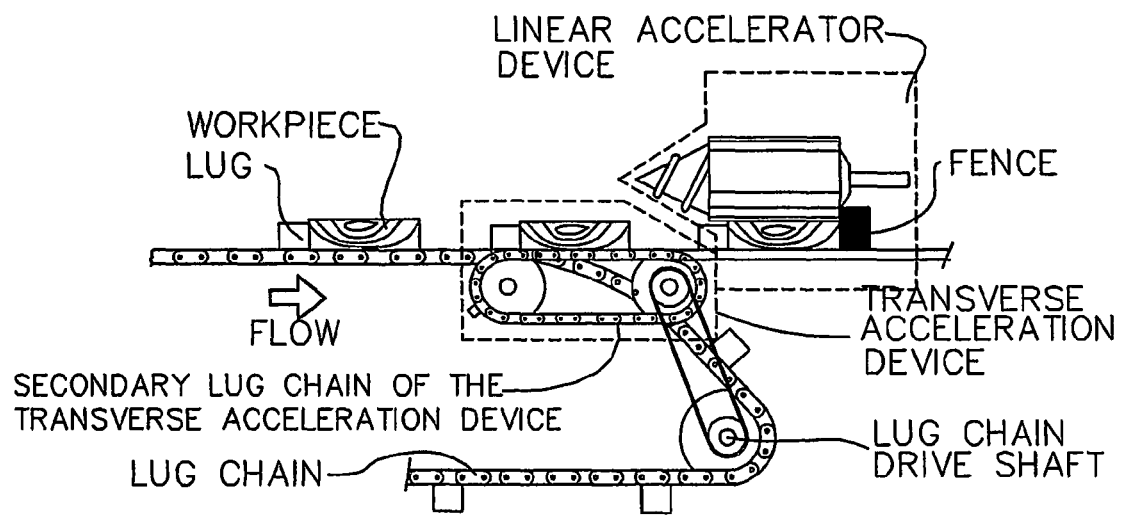
FIG. 17 is, in side elevation view, a transverse acceleration device combined with a linear acceleration device.
Figure 18:
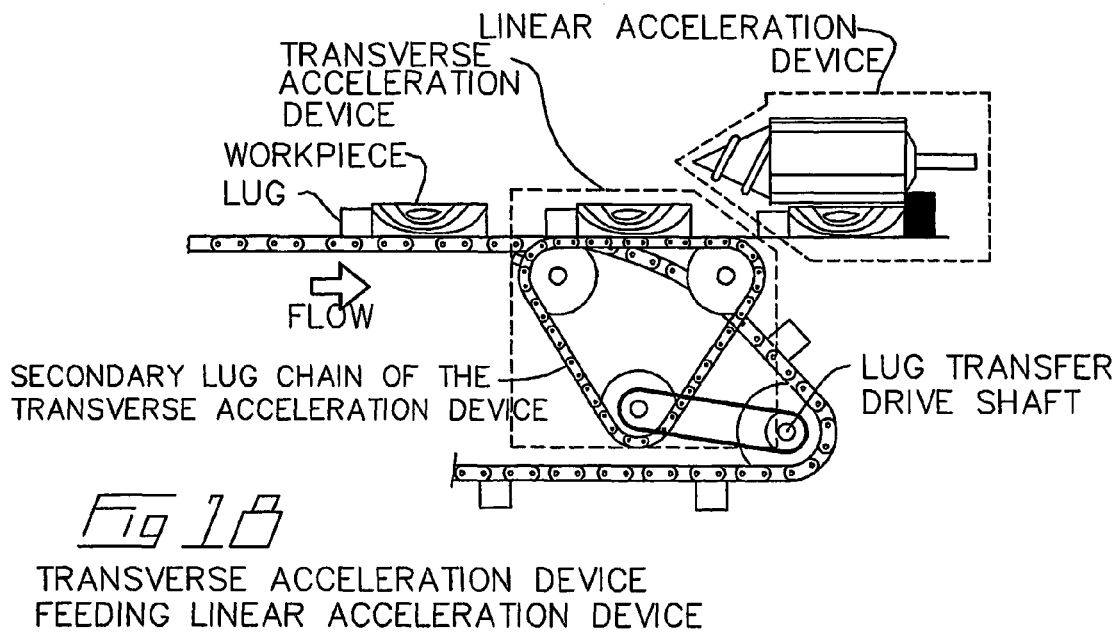
FIG. 18 is, in side elevation view, a transverse acceleration device combined with a linear acceleration device.
Figure 19:
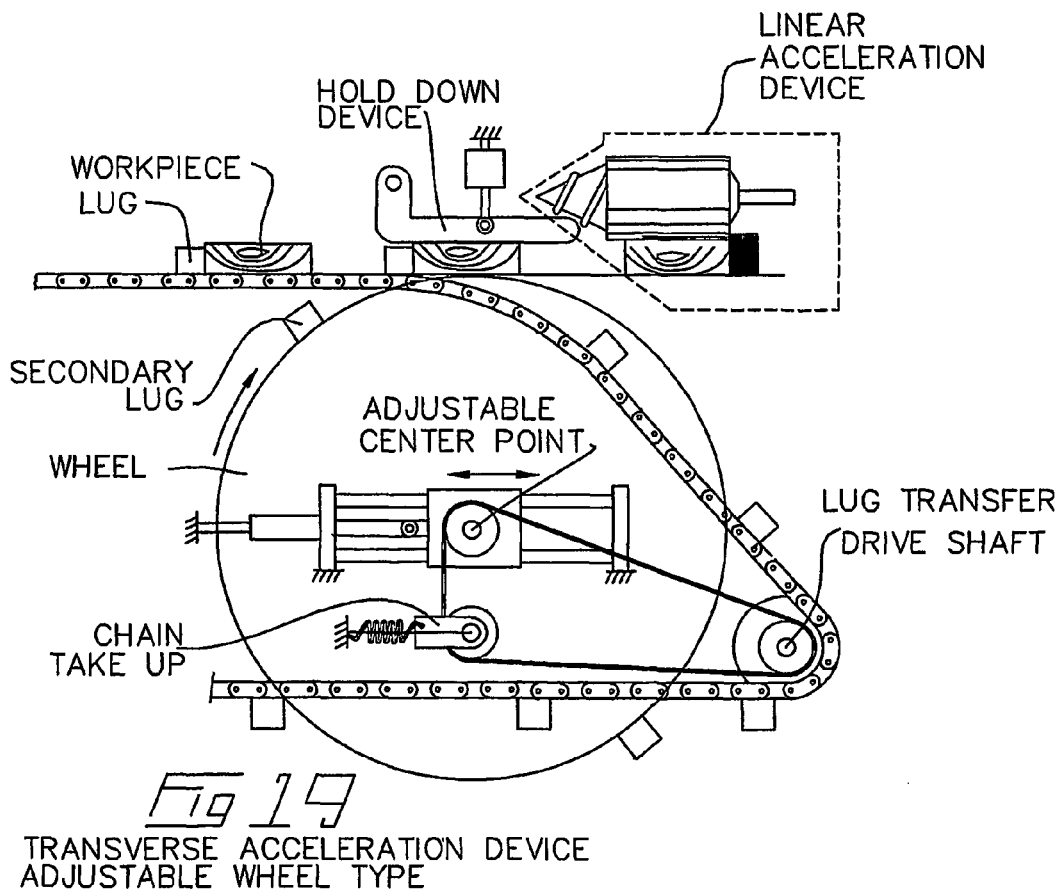
FIG. 19 is, in side elevation view, a transverse acceleration device with an adjustable wheel.

FIGS. 17, 18 and 19 show examples of fixed speed transverse acceleration devices. A fixed speed transverse acceleration device is any device that is geared to and driven from the drive of the lug transfer or sheet feeder that accelerates the work piece away from the lug transfer or sheet feeder and delivers it to the linear acceleration device. In some instances it is necessary to use a fixed speed transverse acceleration device to more accurately set the gap. A transverse acceleration device will more accurately control the gap between work pieces and in some cases allow the setting of a shorter gap than can be achieved with only the lug chain pushing the work piece into the linear acceleration device. FIG. 17 shows an example of how this works. In this example, the speed at the exit of the linear acceleration device is 1200 feet per minute (20 feet per second). The work pieces are 20 feet long and 12 inches wide and the minimum required gap between work pieces is 0.100 seconds. If the system runs at 100% capacity, the total number of work pieces fed in one minute will be 60 seconds divided by 1.1 seconds (feed time plus gap) or 54.5 pieces per minute. In the case of a fixed speed lug transfer with lugs spaced 18 inches apart the velocity of the lug chain would be 81.8 feet per minute (16.36 inches per second). The lug timing is such that the second work piece is pushed by the lug transfer up next to the first work piece. As the trailing edge of the first work piece passes the leading end of the second work piece, the second work piece will be approximately 12 inches from the fence on the linear acceleration device. If the lug transfer alone pushes the work piece over to the fence of the linear acceleration device it will take approximately 12 inches divided by 16.4 inches per second (lug transfer speed) or 0.733 seconds. The transverse acceleration device can reduce this time by pulling the work piece away from the lug and rapidly pushing the work piece over to the fence of the linear acceleration device. In this example, the minimum required gap time is 0.100 seconds and the actual gap time produced by the lug transfer is 0.733 seconds. Depending on the speed of the transverse acceleration device this actual gap time of 0.733 seconds can be reduced to near or equal to the minimum required gap time. The speed of the fixed speed transverse acceleration device is manually set and is not varied automatically by the process control system to establish and/or control and/or correct the gap between work pieces. The speed of the fixed speed transverse acceleration device is proportional to and dictated by the speed of the fixed or variable speed lug transfer device.

FIG. 17 shows a fixed speed transverse acceleration device that is driven by the same drive that drives the lug transfer. In this configuration, a secondary lug chain transfer with one single lug is driven off of the lug transfer drive through a 2:1 ratio speed up drive. In this case the lug space of the secondary lug chain is twice that of the lug space of the transfer. This single lug chain is timed with the lug transfer so that the single lug contacts the work piece just as the lug on the lug transfer starts to drop down out of the feed path. Since the velocity of this lug is twice that of the lug transfer, it accelerates the work piece away from the lug transfer onto the linear acceleration device, thereby reducing the actual gap time normally produced by the lug transfer by a factor of two. One can imagine, that by increasing the lug space (length) of the single lug secondary lug chain by any multiple of the lug space of the lug transfer and gearing the speed up drive by the same ratio, will proportionally reduce the actual gap time of the lug transfer by a factor equal to the ratio of lug transfer lug spacing to the secondary lug chain lug spacing.

FIG. 18 shows an alternative fixed speed transverse acceleration device. In this example the secondary single lug chain lug space is three times that of the lug space of the lug transfer. The gearing between the lug transfer and the secondary single lug chain is set up to be 3:1 speed up ratio causing the secondary single lug chain to run three times faster than the lug transfer. The fixed speed transverse acceleration device may use different mechanical means to accelerate the work piece away from the lug transfer onto the linear acceleration device. Without intending to be limiting, FIGS. 19 through 22 illustrate alternate embodiments of fixed speed transverse acceleration devices.

Figure 21:
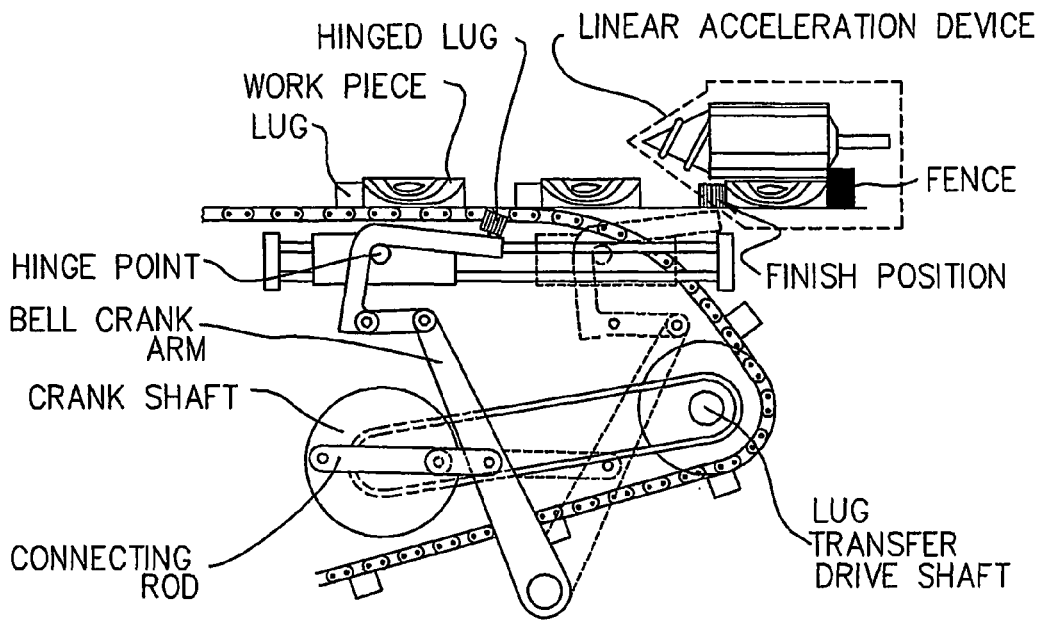
FIG. 21 is, in side elevation view, a transverse acceleration device with a slider crank.

FIG. 21 shows a slider crank fixed speed transverse acceleration device. In this example a sliding hinged lug is mechanically linked to the lug transfer drive through a crank shaft, connecting link, and bell crank arm mechanism. In this example, the gearing between the lug transfer drive shaft and the sliding hinged lug is such that the hinged lug travels one lug transfer lug space forward and back while the lug transfer travels one lug space. Therefore, the hinged lug travels the distance of one lug transfer lug space twice as fast as the lug transfer.

Figure 22:
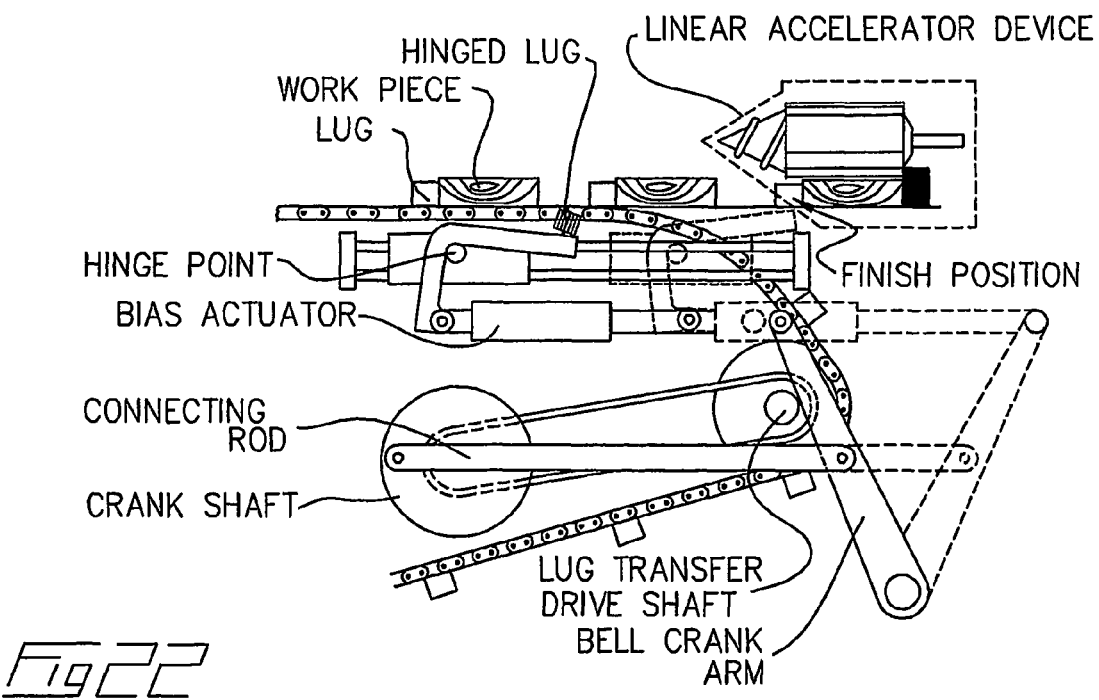
FIG. 22 is, in side elevation view, a transverse acceleration device with adjustable start and stop points.

FIG. 22 shows basically the same slider crank fixed speed transverse acceleration device as that shown in FIG. 21 with one exception. The link between the bell crank arm and the hinged lug is not a fixed length but rather a variable length. By varying the length of this link, the start and stop positions of the hinged lug can be varied. This has an advantage over fixed start and stop points when it comes to running varying width work pieces. An example of this is if the start and stop points of the hinged lug are set to feed 12 inch wide work pieces onto the linear acceleration device then the stop point of the hinged lug would be approximately 12 inches plus a safety factor of 1 inch from the fence of the linear acceleration device (or 13 inches total). Now if 4 inch wide work pieces are fed with the same settings, the 4 inch wide work pieces would end up being placed 9 inches from the fence of the linear acceleration device. Varying the length of the connecting link between the bell crank arm and the hinged lug by 8 inches (8 inches shorter in this example) will move the start and stop points of the hinged lug 8 inches closer to the fence of the linear acceleration device. In this case the 4 inch wide work piece would be positioned approximately 1 inch from the fence of the linear acceleration device. One can imagine that by varying the position of the secondary single lug chain assembly in FIGS. 17 and 18 that the final position of the work piece relative to the fence of the linear acceleration device can be adjusted.

Figure 20:
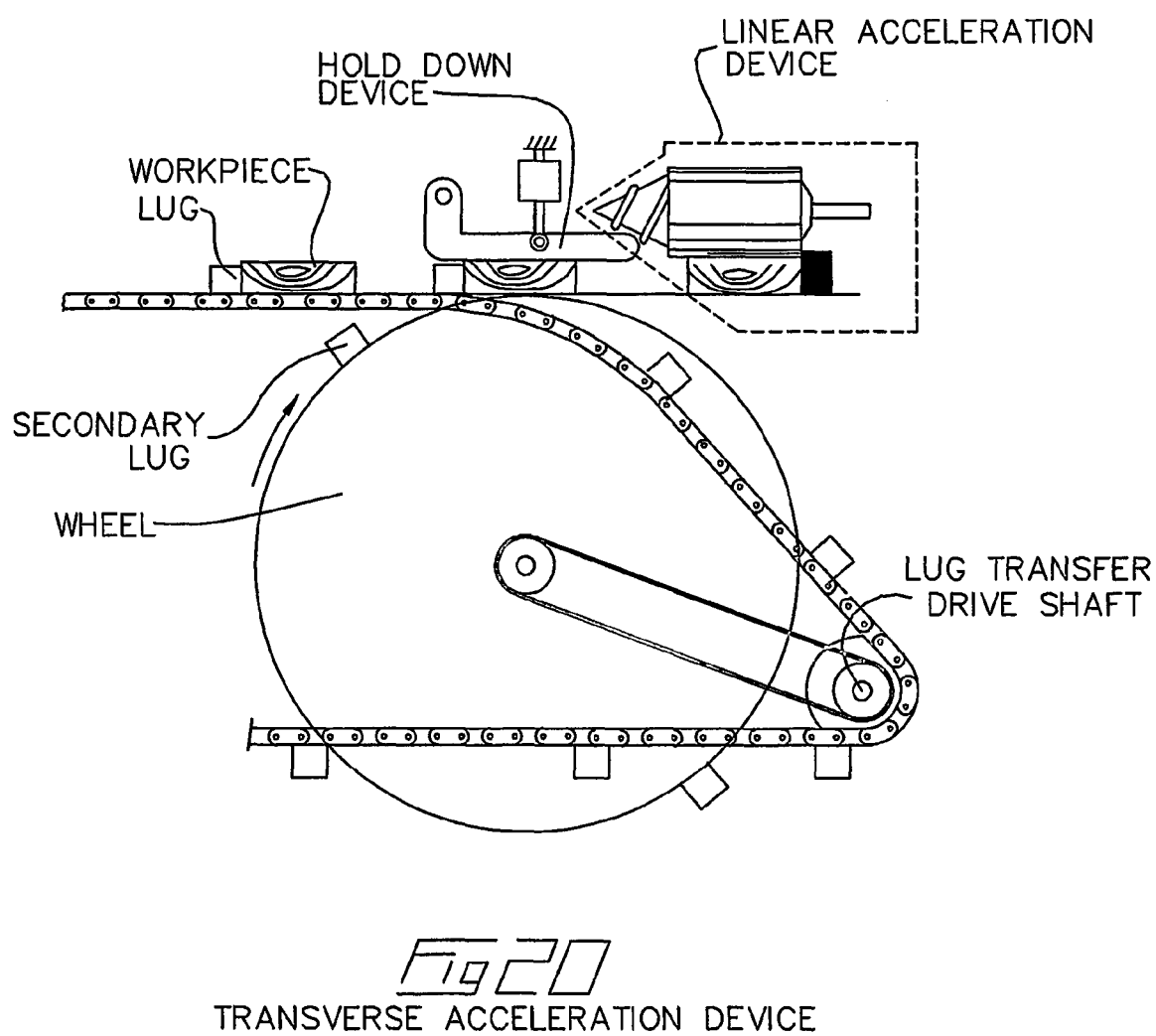
FIG. 20 is, in side elevation view, a transverse acceleration device.

FIG. 20 shows an alternate embodiment of the fixed speed transverse acceleration device. In this example, a large wheel with a single lug is driven from the lug transfer drive through gearing with a ratio equal to the ratio of lug transfer lug space and the circumference of the wheel. In this example, the single lug wheel has a circumference equal to 8 times the lug transfer lug space. The velocity of the single lug is 8 times the velocity of the lug transfer lug. One can imagine placing two lugs 180° apart on the wheel and gearing the wheel to run 4 times faster than the lug transfer thereby slowing the speed of the wheel lugs to be 4 times faster than the lug transfer lugs. This accelerator lug can in this case be run two times faster than the lug transfer lugs. By placing the lugs on the wheel 90° apart and gearing the drive to run the peripheral speed of the wheel twice the speed of the lug transfer. Varying wheel circumference in multiples of lug transfer lug space and gearing the drive accordingly can yield many multiples of the speed ratio between the lug transfer and the wheel lug. In the example, an overhead hold down device is used to stabilize the work piece.

FIG. 19 is an alternative embodiment of the wheel type transverse acceleration device. In this example, the wheel can be positioned right to left in order to adjust the final position of the work piece relative to the fence of the linear acceleration device.

In all of the transverse acceleration devices shown in FIGS. 17 through 22 the object is to position the work piece as close to the fence of the linear acceleration device as possible. This positioning of the work pieces near the fence of the linear acceleration device is called far side referencing. That is because the side of the work piece being positioned next to the fence or reference line of the linear acceleration device is the side of the work piece furthest from the face of the positioning lug. The near face of the work piece may be positioned relative to, and a set distance from, the fence or reference line of the linear acceleration device. This would be known as near side positioning. Near side positioning may be advantageous in some cases because the narrower work pieces do not have to be pushed all the way across to the fence of the linear acceleration device. If near side positioning is used, there is no need to vary the start and stop positions of the secondary lugs of the transverse acceleration device to compensate for various widths of work pieces.

Variable Speed Transverse Acceleration Device (13)

A variable speed transverse acceleration device is any device that accelerates the work piece away from the lug transfer lug and delivers it to the linear acceleration device that is not geared to and/or driven by the lug transfer drive. Any of the fixed speed transverse acceleration devices shown in FIGS. 17 through 19 could be changed to a variable speed transverse acceleration device if they are driven with a drive that is independent of the lug transfer drive. These drives that power the variable speed transverse acceleration device could be one or a combination of drive types, for example, fixed speed A.C. drive, variable speed A.C. drive including variable frequency and vector drives, fixed speed or variable speed D.C. drives, servo drives, stepper drives, hydraulic or pneumatic drives. A variable speed transverse acceleration device is used in conjunction with gap sensing and computerized process control to more accurately establish and/or control and/or correct the minimum required gap between pieces. For example, if a work piece for some reason is caused to hesitate or accelerate slower that expected on the linear acceleration device, then a fixed speed transverse acceleration device could or would drive the next work piece over into the path of the work piece that hesitated on the linear acceleration device. This situation could be avoided by using a variable speed transverse acceleration device in conjunction with sensing and computerized process controls. When sensing detects the location of the trailing end of the first work piece that is on the linear acceleration device to be in a position that can or will cause the second work piece being positioned by the transverse acceleration device to collide with the first work piece, then this sensing information working through the computerized process controls will be used to control the actual position and/or velocity and/or acceleration of the work piece on the variable speed transverse acceleration device and in this example slow down or stop the transverse acceleration device for the second work piece until the first work piece is at a position and/or velocity and/or acceleration that will allow the continued transverse positioning of the second work piece. The variable speed transverse acceleration device is used in both closed loop non-optimized and closed loop optimized gap control methods.

There may be many variations to the variable speed transverse acceleration device. Some examples for instance could be hydraulic linear actuators or multiple hydraulic linear actuators working in sequence to position the secondary lugs, ball screw or multiple ball screw actuators working in sequence to position the secondary lugs. Due to the extremely high velocities of the secondary lugs that may be necessary to set very short gaps, it may be necessary to use multiple secondary lugs all operating independently of one another or in a coordinated manner. While one group of secondary lugs is accelerating a work piece onto the linear acceleration device the remaining group or groups of secondary lugs may be either setting in wait to accelerate the next work piece or returning back to the start position from having just positioned a work piece.

Fixed (14) and Variable Speed (15) Linear Acceleration Devices

FIGS. 9 through 22 show examples of fixed speed and or variable speed linear acceleration devices. A linear acceleration device is any device that accepts a work piece from, a lug transfer, fixed speed transverse acceleration device, variable speed transverse acceleration device, sheet feeder, drop feeder, hopper feeder, vertical acceleration device or other device, and accelerates the work piece linearly (substantially along the length axis of the work piece) towards the planer infeed and/or planer. Some examples of linear acceleration devices are: roller beds, roller beds used in conjunction with pinch rollers, linear chain conveyors, belt conveyors, catapults, lug chains, pusher lugs, end dog devices, lugged belts and air tables. A fixed speed linear acceleration device is any linear acceleration device that the speed of is manually controlled and is not automatically varied to establish and/or control and/or correct the gap between work pieces. Fixed speed linear acceleration devices can be utilized in all three gap control methods, open loop non-optimized, closed loop non-optimized, and closed loop optimized.

A variable speed linear acceleration device is any linear acceleration device that allows the instantaneous position and/or velocity and/or acceleration of the work piece being accelerated to be automatically controlled. The linear motion characteristics (i.e. the instantaneous position and/or velocity and/or acceleration) of the work piece on the variable speed linear acceleration device are controlled in conjunction with the sensing of the motion characteristics of the work piece and neighboring work pieces, (work pieces that may be on the transverse acceleration device or work pieces that may be ahead of the work piece that is on the linear acceleration device) the processing of the sensed data with the computerized process control system and acting upon the processing of this data though the drive of the variable speed linear acceleration device. Variable speed linear acceleration devices can be utilized in both the non optimized and optimized closed loop gap control methods.

Sheet Feeder (11) and Vertical Acceleration Device (16) Combination

FIG. 12 show an alternative, sheet feeder/vertical acceleration device combination. In these example, the work piece that is to be moved or positioned over the work piece that is on the linear acceleration device can be accelerated transversely by the gate or shutter that holds the work piece above the linear acceleration device. There may be many alternative ways to use sheet feeders and hopper feeders. For example the sheet could be on a steep incline using the force of gravity to advance the sheet and load the work piece onto the linear acceleration device. An inclined sheet feeder could also use the force of gravity to load the hopper feeder. An inclined sheet feeder could feed a linear acceleration device that accepts and accelerates the work pieces in a vertical (wide sides vertical) or near vertical orientation.

Lug Transfer (8,9) and Vertical Acceleration Device (16) Combination

Figure 14:
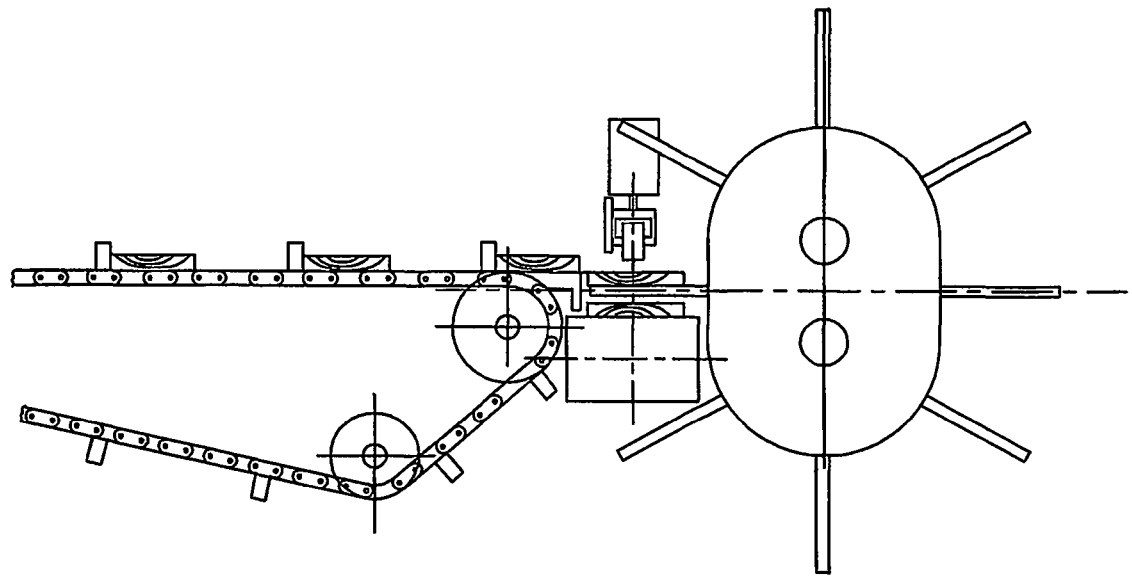
FIG. 14 is, in side elevation view, a continuous indexible support arm vertical acceleration device.
Figure 14A:
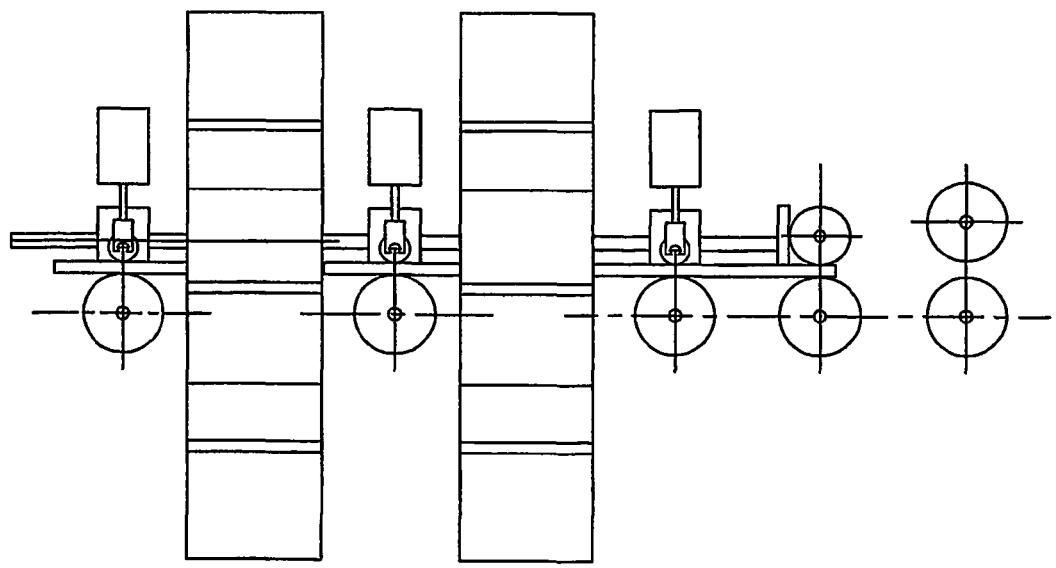

FIG. 14 shows an alternative method of combining a lug transfer with a vertical acceleration device. In this example the lug transfer loads the work pieces onto a bed of support arms that hover over the work piece that is being accelerated on the linear acceleration device. When the trailing end of the work piece being accelerated on the linear acceleration device is detected to be in a location at or near the leading end of the work piece hovering above on the support arms of the vertical acceleration device, the support arms of the vertical acceleration device will index down placing the next work piece onto the linear acceleration device. As the support arms index down, the next set of support arms move into position to get loaded with the next work piece from the lug transfer and hover this work piece above the linear acceleration device until it is time to index it down to the linear acceleration device.

There may be many combinations of the continuous indexible support arm device shown in FIG. 14. In this figure the continuous indexible support arm device places the work piece onto the bed of the linear acceleration device and continues to index as the pinch rollers clamp the work piece to the driven bed of the linear acceleration device assisting in accelerating the work piece. Another application of the continuous indexible support arm might involve loading one or more support arms with work pieces above the hover position. Another variation might involve placing the support arms closely adjacent to one another and loading the work pieces from a lug transfer or sheet feeder located on the side of the continuously indexible support arm device that is opposite to the side that the linear acceleration device is located. These work pieces would be carried over the top of the indexible support arm device in what would be considered a loaded magazine style. The work pieces could be loaded onto alternating support arms from both sides simultaneously. All of the before mentioned sheet feeders, vertical acceleration devices, hopper feeders, catapults, pinch roller accelerator devices, and continuously indexible support arm devices can be used with or without work piece sensing, computerized process control and computer optimization, or computer gap optimization. These devices can be combined and configured to work in and provide any of the three methods of gap control, open loop non optimized, closed loop non-optimized, and closed loop optimized.

Linear Work Piece Interrogator (17)

A linear work piece interrogator may be conventional geometric scanning equipment that uses lasers to measure the geometric properties of each work piece. Other linear work piece interrogators may be used to detect the properties of the incoming work piece to control the gapping between the work pieces. Examples of such work piece interrogators may include vision systems, ultrasonic based geometric and or defect scanners, x-ray sensors, moisture sensors, dielectric sensors or contacting thickness gauges. These alternate work piece interrogators may be used separately, in combination with each other, or in combination with traditional laser based geometric scanners. These alternative instruments may detect work piece geometry, defect information or other relevant data that could be used to most optimally control the minimum required gap of each individual work piece. Examples of measured properties besides geometric data may include grain geometry, knot location and geometry, surface finish, density variation, moisture content, and color variation.

Fixed Speed Planer Infeed Transport Device (18)

A fixed speed planer infeed transport device is any device that accepts a work piece generally linearly along the length or longitudinal axis of the work piece from at least one and possibly multiple linear acceleration devices and conveys or transports the work pieces from the linear acceleration device or devices to the infeed end of the planer. This fixed speed planer infeed transport device may be constructed of one or more of the following subcomponents for example: a powered roller bed, a powered roller bed with overhead pinch rollers, a chain bed, a chain bed with overhead pinch rollers, a roller bed or belt conveyor or chain bed or air table with an overhead powered pinch belt or rolls. The fixed speed planer infeed transfer device may be oriented in either the vertical or horizontal plane (or some other angle). The speed of the fixed speed planer infeed transport device is varied manually meaning the speed is not varied automatically by the process control system in an effort to establish and/or control and/or correct the gap between work pieces. A fixed speed planer infeed transport device may be used with any of the three methods of gap control, open-loop non-optimized, closed-loop non-optimized, and closed-loop optimized gapping. Not all work piece gapping planer infeed systems require a fixed or variable speed planer infeed transport device. The planer may be fed directly from one or more linear acceleration devices configured in parallel or series.

Variable Speed Planer Infeed Transport Device (19)

Figure 3:
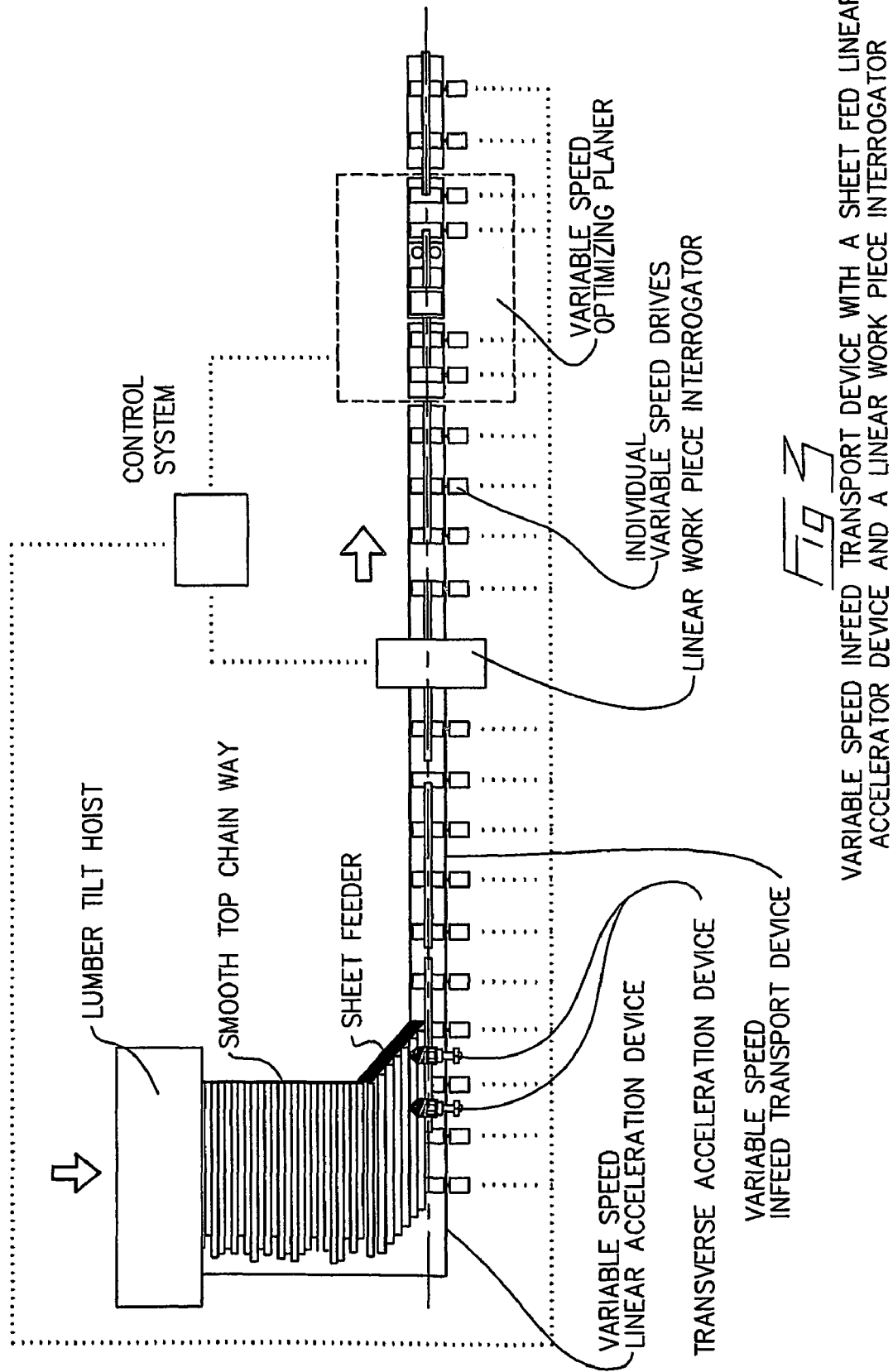
FIG. 3 is, in plan view, an optimizing planer infeed configuration according to one embodiment of the present invention incorporating a variable speed infeed transport device with a sheet fed linear accelerator device and a linear work piece interrogator.

A variable speed planer infeed transport device is any device that can be described and used as a fixed speed planer infeed transport device except that the speed of all or part of this device can be controlled automatically to establish and/or control and/or correct the gap between work pieces. FIG. 3 shows an example of a variable speed planer infeed transport device being used in a system along with a sheet fed linear acceleration device, and a linear work piece interrogator. In this example, the work pieces are fed onto the variable speed planer infeed transport device basically butted end-to-end. The position and/or velocity and/or acceleration of the work pieces is detected by sensors placed generally along the length of the variable speed planer infeed transport device. This sensed work piece information is in turn used by the computerized process control system to control the speed of part, all, or multiple parts of the variable speed planer infeed transport device to establish and/or control and/or correct the minimum required gap.

Figure 4:
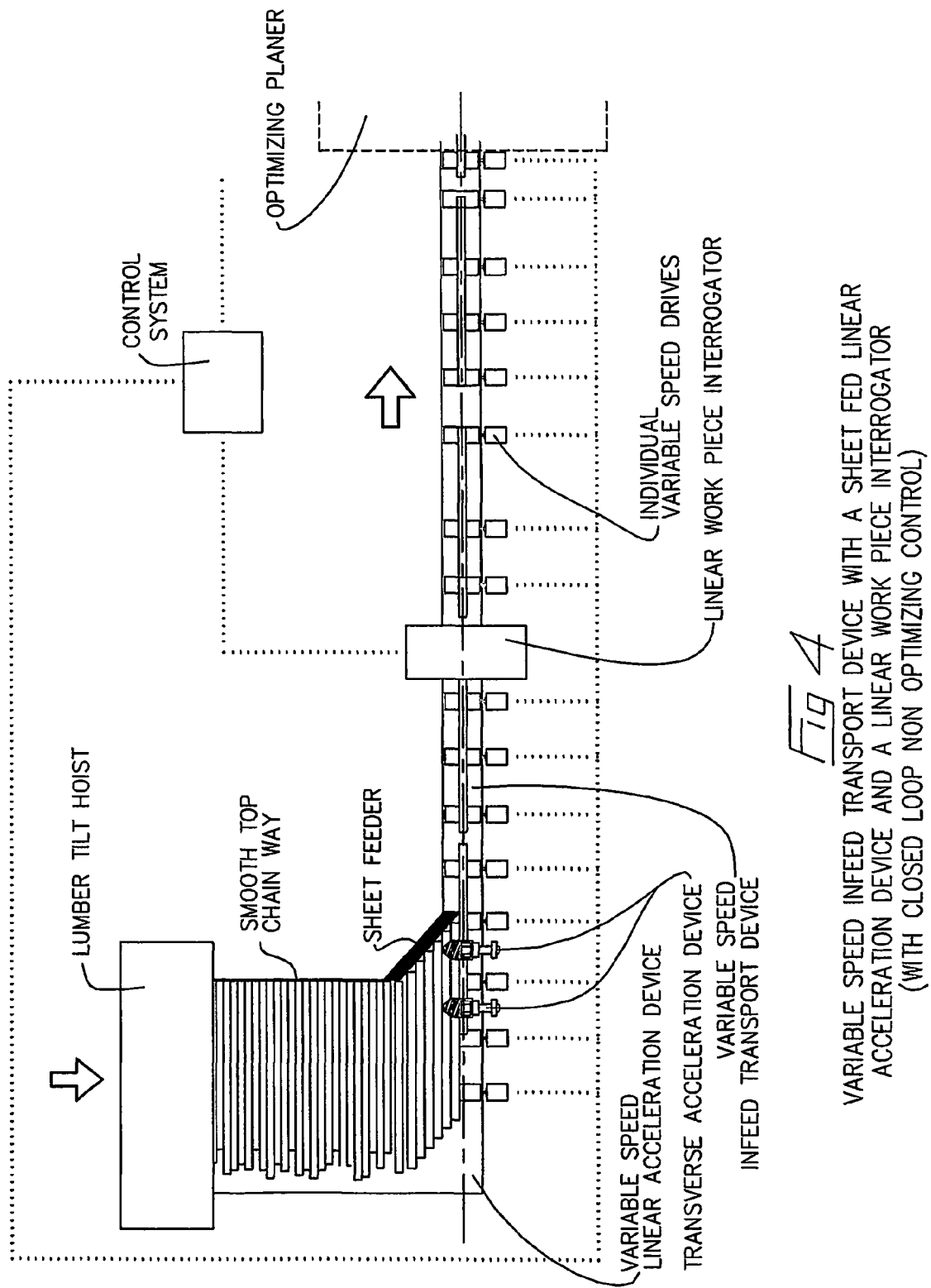
FIG. 4 is, in plan view, the optimizing planer infeed configuration of FIG. 3, with closed loop, non-optimizing control.

FIG. 4 shows a more detailed version of the variable speed planer infeed transport device being used in conjunction with a sheet fed variable speed linear acceleration device and a linear work piece interrogator. In this example, the variable speed planer infeed transport device is a roller bed with pinch rollers located directly above the rolls in the roller bed. The rolls in the roller bed are each driven independently by their own variable speed drive device. In this example, there are multiple work pieces being transported simultaneously on the variable speed planer infeed transport device. The instantaneous position and/or velocity and/or acceleration of each work piece are sensed by work piece sensors placed generally along the length of the infeed transport device. This sensed data is fed into the computerized process control system and is used to calculate and solve for the required velocity and/or acceleration of each individual roller on the variable speed planer infeed transport device. The computerized process control system outputs commands to each variable speed drive driving the individual rollers and directs them to control the instantaneous velocity and/or acceleration of that roller. The minimum required gap is dynamically established and/or controlled and/or corrected in an ongoing fashion as the work pieces are being transported on the variable speed planer infeed transport device. In this example the sheet fed variable speed linear acceleration device is also a roller bed device with variable speed drives on each individual roller. The instantaneous velocity and/or acceleration of these rollers are also controlled by the computerized process control system to establish and/or control and/or correct the minimum required gap between work pieces. This is an example of the second method of gap control, namely, closed-loop non-optimized, where the minimum required gap is a constant depending upon the maximum time it takes to reposition the guiding and/or cutting elements within the planer.

Figure 5:
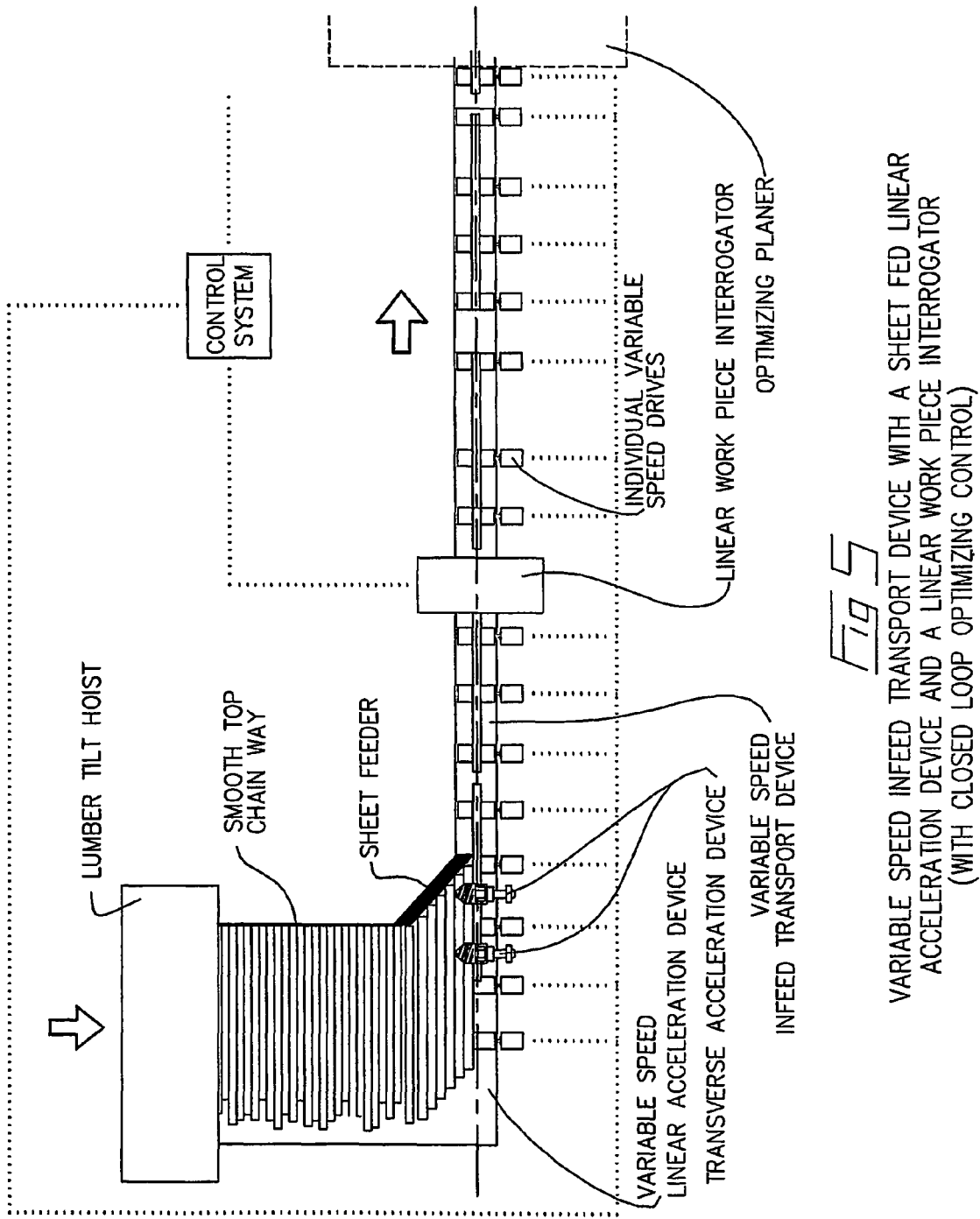
FIG. 5 is, in plan view, the optimizing planer infeed configuration of FIG. 3, with closed loop, optimizing control.
Figure 6:
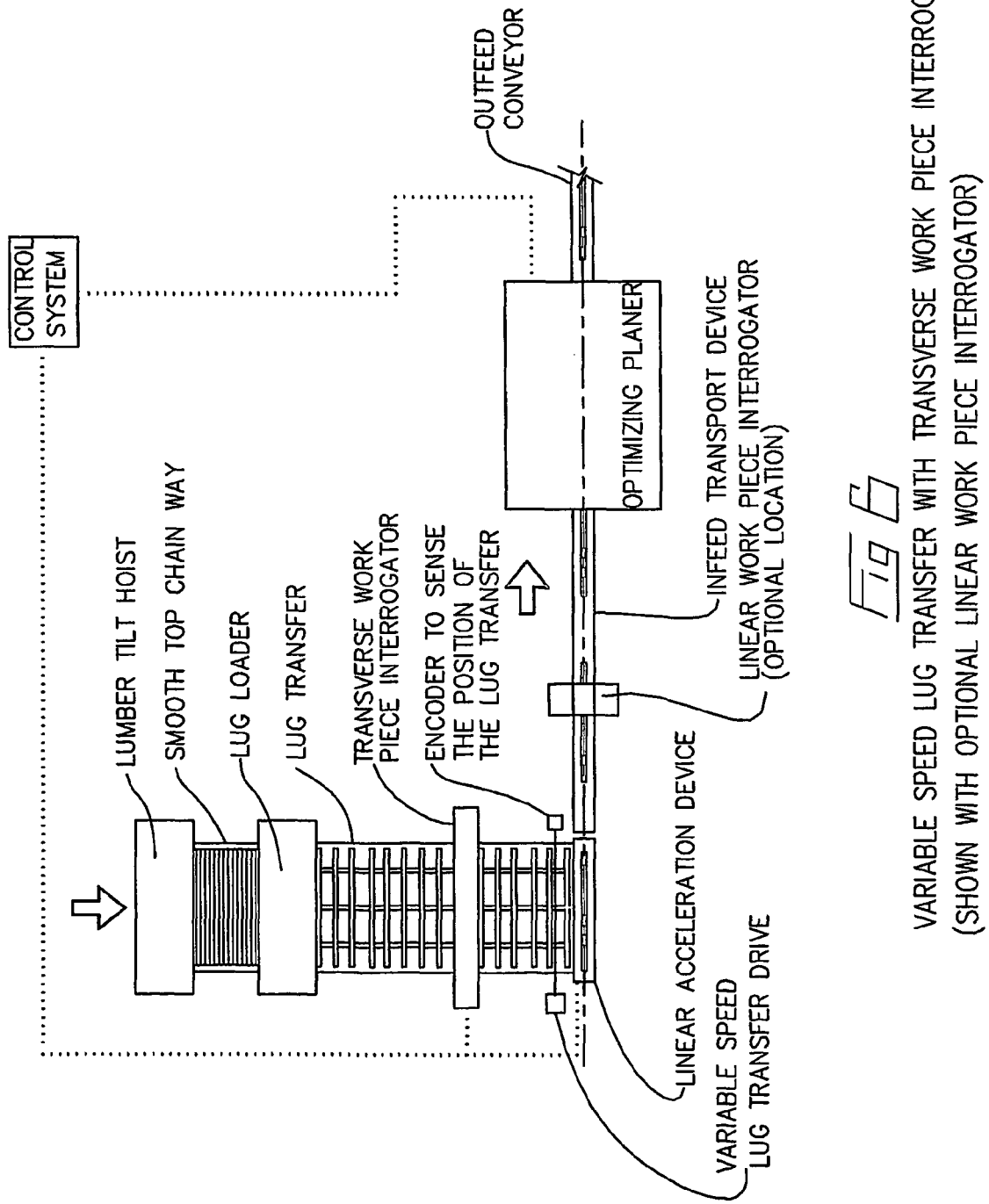
FIG. 6 is, in plan view, an optimizing planer infeed configuration according to one embodiment of the present invention incorporating a variable speed lug transfer, a transverse work piece interrogator and a linear work piece interrogator.
Figure 7:
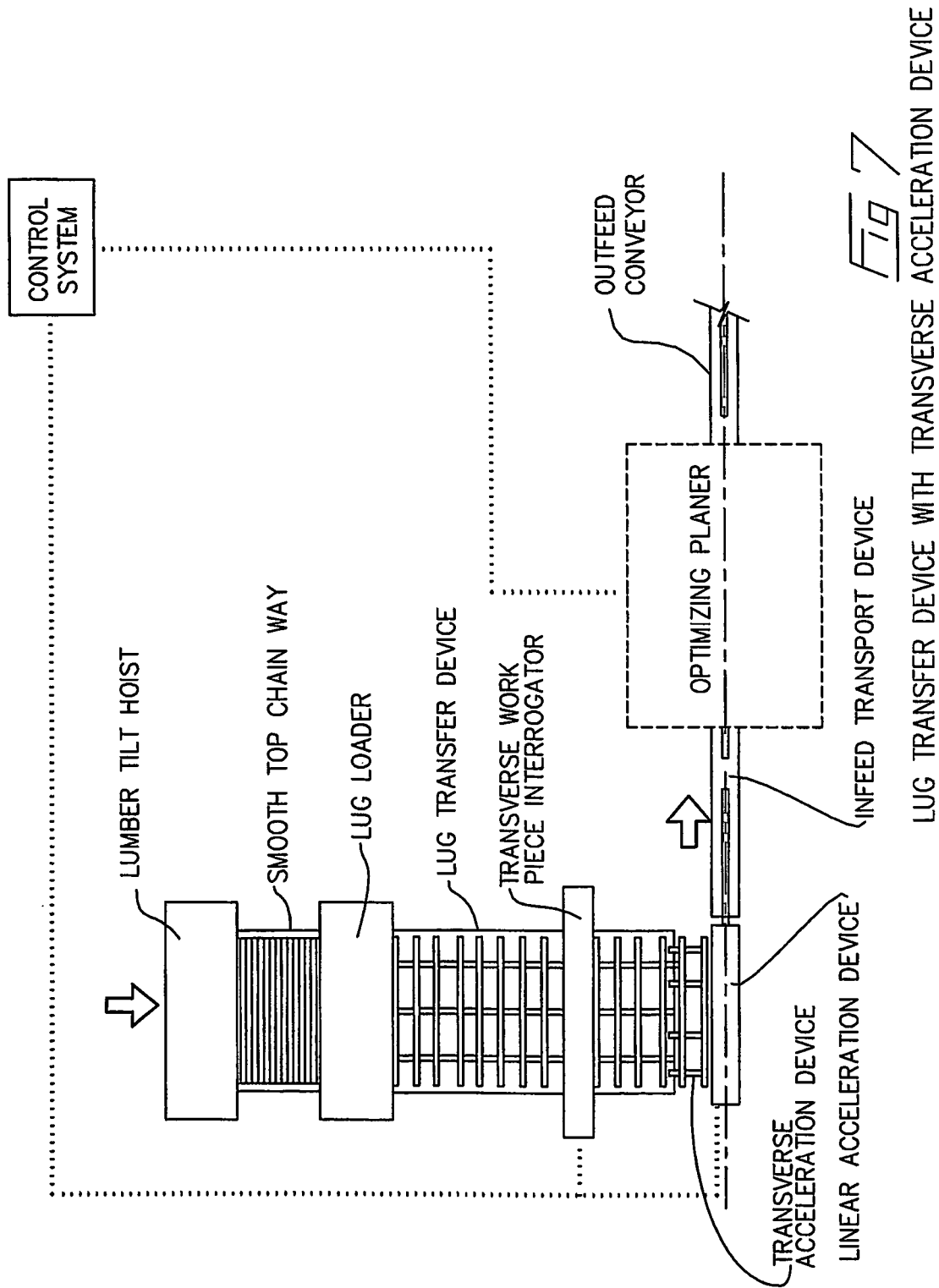
FIG. 7 is, in plan view, a lug transfer device with a transverse acceleration device.
Figure 8:
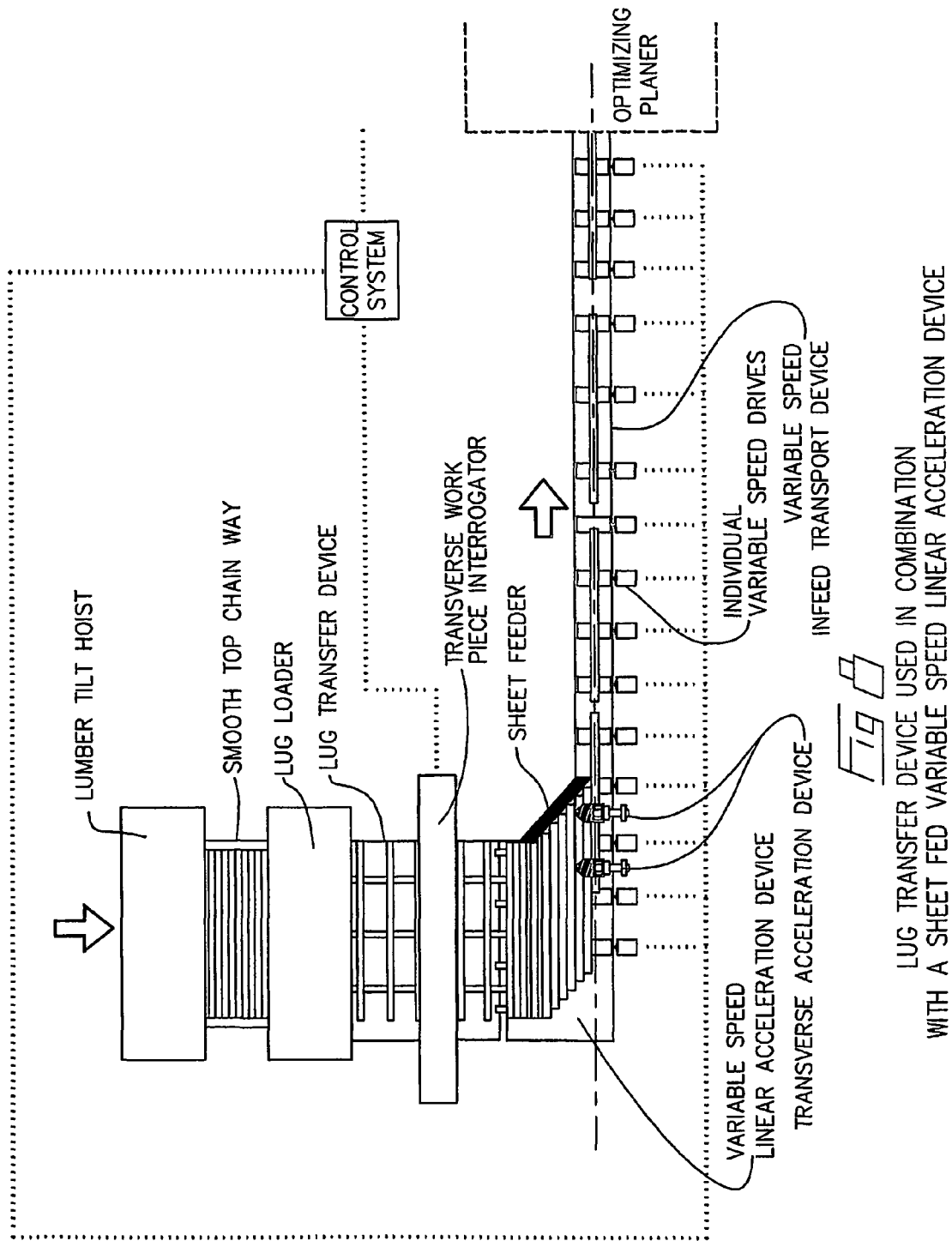
FIG. 8 is, in plan view, a lug transfer device used in combination with a sheet fed variable speed linear acceleration device.

FIG. 5 shows an example similar to that of the example shown in FIG. 4 except that this example shows the third method of gap control, namely, closed-loop optimized gap control. In this example, the variable speed planer infeed transport device is used in conjunction with a sheet fed variable speed linear acceleration device and a linear work piece interrogator. The variable speed planer infeed transport device is a roller bed with pinch rolls located directly above the rollers in the roller bed. The rolls in the roller bed are each driven independently by their own variable speed drive device. In this example, the minimum required gap will be determined by the actual predicted time that is will take for the repositioning of the guiding and/or cutting elements within the planer. The linear work piece interrogator collects data on each work piece as it travels through the linear work piece interrogator. This data is used by the work piece optimization system to solve for the most optimum position of the guiding and/or cutting elements within the planer. Knowing the position of the guiding and/or cutting elements within the planer at the trailing end of one work piece and knowing the required position of the guiding and/or cutting elements within the planer at the leading end of the next work piece, the actual time that it takes to move the guiding and/or cutting elements from one position to the next can be very accurately predicted and controlled. It is this predicted and/or controlled time that it takes to move from one position to the next that establishes the minimum required gap. In this case this minimum required gap between any two work pieces is not know until both of the work pieces have passed through the linear interrogation device. The computerized process control system uses this predicted minimum required gap information in conjunction with sensed work piece instantaneous position and/or velocity/and/or acceleration information to solve for and control the velocity and acceleration of each individual roller (or a zone or a multitude of separate zones) in the variable speed linear acceleration device and the variable speed planer infeed transport device to dynamically establish and/or control and/or correct the minimum required gap between work pieces. This is a dynamic process in which the work piece position is constantly sensed and the velocity and acceleration of each individual work piece is constantly updated and controlled in a manner to:

1. establish the minimum required gap as the work pieces are being transported,
2. continually monitor and control the established minimum required gap, and
3. continually make corrections to maintain the minimum required gap.

There may be many variations of optimized dynamic gapping using a variable speed planer infeed transport device in combination with other devices. For example, a variable speed lug transfer with a variable speed transverse acceleration device used in conjunction with a fixed speed linear acceleration device and a variable speed planer infeed transport device all used in conjunction with a transverse work piece interrogator can be controlled in a manner that allows the establishment of, the control of and the ongoing continuous correction of the minimum required gap. For example, the predicted minimum required gap between work pieces is known after the work pieces are passed through the transverse work piece interrogator and while they are still on the variable speed lug transfer. The variable speed lug transfer in conjunction the variable speed transverse acceleration device will control the flow of work pieces onto the fixed speed linear acceleration device. The fixed speed linear acceleration can be running at a speed greater than the speed required to feed the work pieces with zero gap. This speed to feed the work pieces with zero gap in this case is the speed of the fixed speed planer. The flow of work pieces to the fixed speed linear acceleration device is modulated by controlling the speed of the variable speed lug transfer and the variable speed transverse acceleration device. The position and/or velocity and/or acceleration of each work piece is continuously sensed as they are delivered to the variable speed planer infeed transport device from the fixed speed linear acceleration. The minimum gap time between work pieces may have been established by the modulation of the variable speed lug transfer and variable speed transverse acceleration device as the work pieces were fed onto the fixed speed linear acceleration device. If so or even if not so, the position and/or velocity and/or acceleration of each individual work piece is continuously sensed as it travels on the variable speed planer infeed transport device. The computerized process control system will continuously update the velocity and/or acceleration of each individual roller in the variable speed planer infeed transport device to ensure that the minimum required gap is established and/or controlled and/or corrected for each individual work piece as it is being fed into the fixed speed planer.

Fixed Speed Planer (20)

A fixed speed planer is a planer that has its speed controlled manually and not by the computerized process control system in an effort to establish and/or control and/or correct the minimum required gap between work pieces.

Variable Speed Planer (21)

A variable speed planer is a planer that has its speed controlled automatically by the computerized process control system in an effort to establish and/or control and/or correct the minimum required gap between work pieces.

Additional Gap Optimization Strategies

In a closed loop optimizing planer infeed system it is possible for the computerized process control system and/or the work piece optimization system to determine a predicted work piece trim decisions through the use of sensing devices prior to planing. A trim decision is the decision to trim a work piece after planing to its optimum length, cutting off defective or unwanted material from one or both ends of the work piece. The trim decision information for each work piece once fed to the control system can then be used to reduce and/or eliminate the minimum required gap time by allowing the guiding and/or cutting elements to reposition while in the area of the work piece designated to be trimmed. This is illustrated in FIG. 23.

Optimizing Planer Infeed System Combinations

There are many combinations of planer infeed system components that can be configured to operate as a gap producing planer infeed system. Some examples may be:

The sheet fed fixed speed linear acceleration device in combination with a fixed speed planer infeed transport device and a fixed speed planer is one possible combination. In this example, the fixed speed linear acceleration device is set to run slower than the fixed speed planer infeed transport device so that the work pieces are accelerated away from the fixed speed linear acceleration device by the fixed speed (high speed) infeed transport device. The amount of gap that is established between work pieces is dependent upon the speed difference between the two devices. This is an example of open loop non optimizing gapping.

A sheet fed fixed speed linear acceleration device in combination with a variable speed planer infeed transport device and a variable speed planer. In this example, the fixed speed linear acceleration device is set at a speed necessary to feed a certain number of work pieces per unit of time. The variable speed planer infeed transport device working in conjunction with the variable speed planer are controlled to run at speeds and accelerations that establish and/or control and/or correct for the minimum required gap between work pieces. Work piece sensing along with computerized process controls would be used in this example of closed loop non optimizing gapping.

By adding a linear work piece interrogator and changing to a variable speed linear acceleration device in the configuration in the previous example, and determining the minimum required gap between each individual work piece, the system may be changed from a non optimizing-system to a fully optimized system.

Another example may be, a lug loader feeding a variable speed lug transfer that feeds a variable speed linear acceleration device that feeds a variable speed planer infeed transport device feeding a variable speed planer. This combination along with a transverse work piece interrogator, work piece sensing, computerized process controls and work piece optimization could be configured to operate as a closed loop optimized system.

There are many more combinations of planer infeed devices that can be set up and controlled to operate as gapping infeed systems. The matrix of combinations shown in FIG. 24 is a representative list of many but not all possible combinations of devices.

Another aspect of this invention is the recognition that not all existing sawmills and/or planer mill complexes will be able to install and operate an optimized planer system because of one or more of the following reasons:

1) There is not enough space in and around the existing planer system to allow the installation of an optimized planer system, 2) Major foundation modification and/or additional piling has to be driven in an inaccessible location, 3) The cost of modifying the existing site and putting in all new planermill equipment is too expensive, 4) The volume produced by the planermill is not large enough to justify the installation of an all new optimized planer system.

Being able to modify the existing non-optimized planer system and converting it into an optimized planer system may potentially save hundreds of thousands of dollars over installing a new optimized planer system. There are many combinations of the components that make up an optimized planer system. Depending on the configuration of the existing non-optimized planer system, the most cost effective and efficient way to convert the system to an optimized system can be determined. Most non-optimized planer systems currently consist of the following devices (see FIG. 25), a tilt hoist feeding sheets of work pieces onto a smooth transfer deck which sheet feeds the work pieces onto a linear acceleration device. The linear acceleration device accelerates the work pieces towards the planer. A short planer infeed transport device is usually located between the linear acceleration device and the planer. The speed of all of these component devices would be fixed speed and are controlled manually. In this example, the fixed speed linear acceleration device is set to run faster than the fixed speed planer infeed transport device and the planer. Setting the system up this way causes the work pieces to be fed end-to-end with no gap.

The non-optimized planer system as shown in FIG. 25 can be converted to a fully optimized planer system using any one of the three methods of gap control, (1) open loop non-optimized, (2) closed loop non-optimized, and (3) closed loop optimized, depending on how the component devices are modified, what other devices are added to the system and the level of work piece sensing, computerized optimization and process control. The most desirable reconfiguration of the non-optimizing planer system might be the configuration shown in FIG. 26. In this example, the non-optimized planer system has been converted to a fully optimized planer system with closed loop optimized gap control. The conversion process involves the following modifications and additions to the non-optimizing system: A short section of the smooth transfer deck is removed to allow the installation of a lug loader. The section of smooth transfer between the lug loader and the linear acceleration device is converted to a lug transfer by either adding lugs to the existing smooth top chain or replacing the chain with one that has lugs already attached. A variable speed drive is added to the smooth transfer deck and a separate variable speed drive is added to the lug transfer. A transverse work piece interrogator is placed along the lug transfer.

The individual rollers or groups of rollers in the linear acceleration device, planer infeed transport device and planer are fitted with variable speed drives. Work piece sensing devices are added to the system on and around the area where the lug transfer delivers the work pieces to the linear acceleration device, along the length of the linear acceleration device and planer infeed transport device and in and around the area of the planer. The necessary modifications are done to the planer machine in order to make the guiding and/or cutting elements movable and able to reposition between work pieces including adding high speed positioning devices to all necessary planer elements. The necessary computerized process controls along with the work piece optimization and gap optimization systems are added to control the now fully optimized planer system. There are numerous other combinations of modifying or adding devices to this system to convert it to on optimized system. If, for example, non-optimizing gap control was desirable then the work piece sensing and variable speed drives could be eliminated from the converted system. In any non-optimized planer system, it will be necessary if it is to be converted to optimized, to modify existing system devices and/or add new devices in order to establish and/or control and/or correct the minimum required gap between work pieces.

Figure 27:
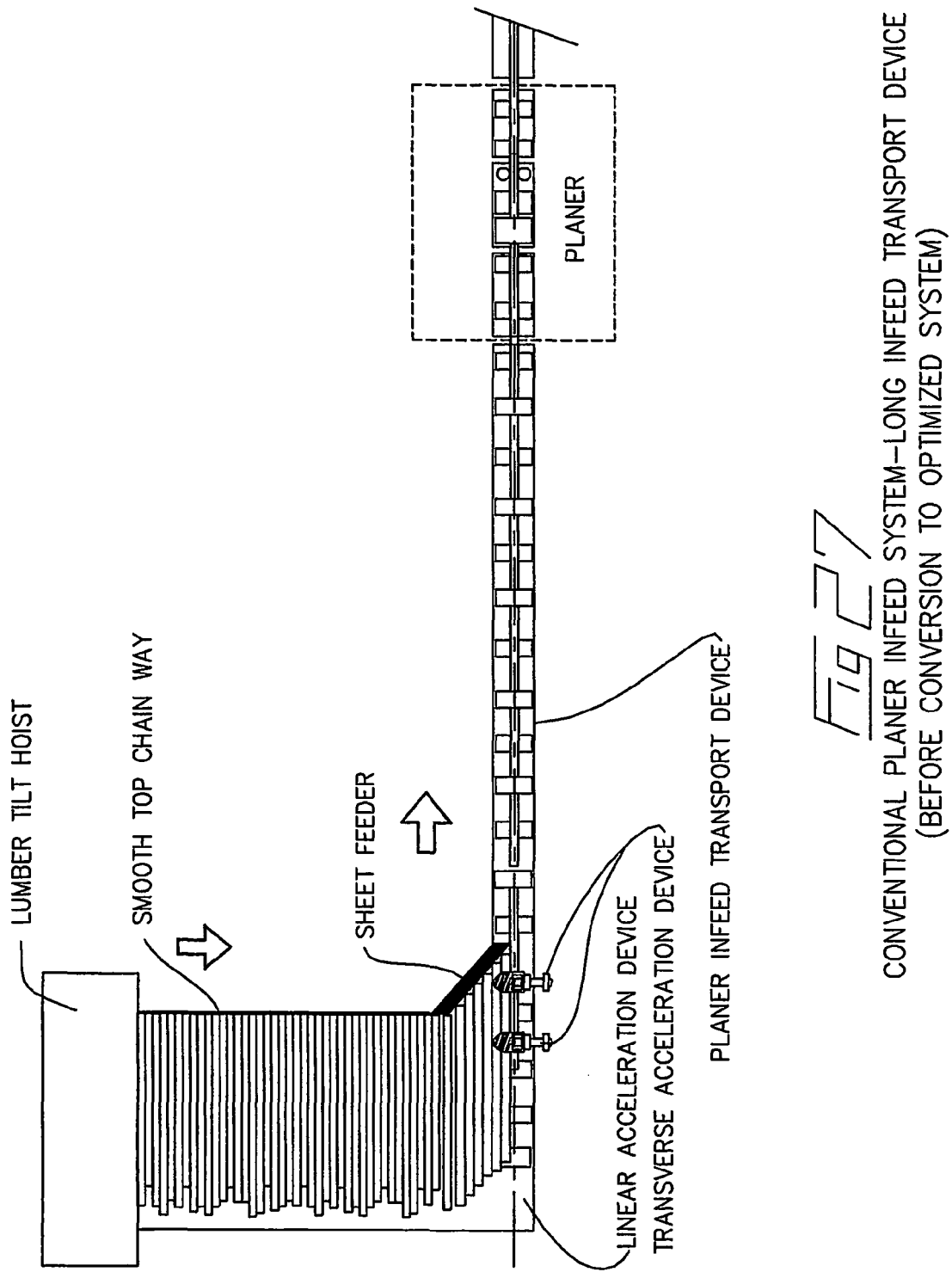
FIG. 27 is, in plan view, a conventional prior art planer infeed system with a long infeed transport device.
Figure 28:
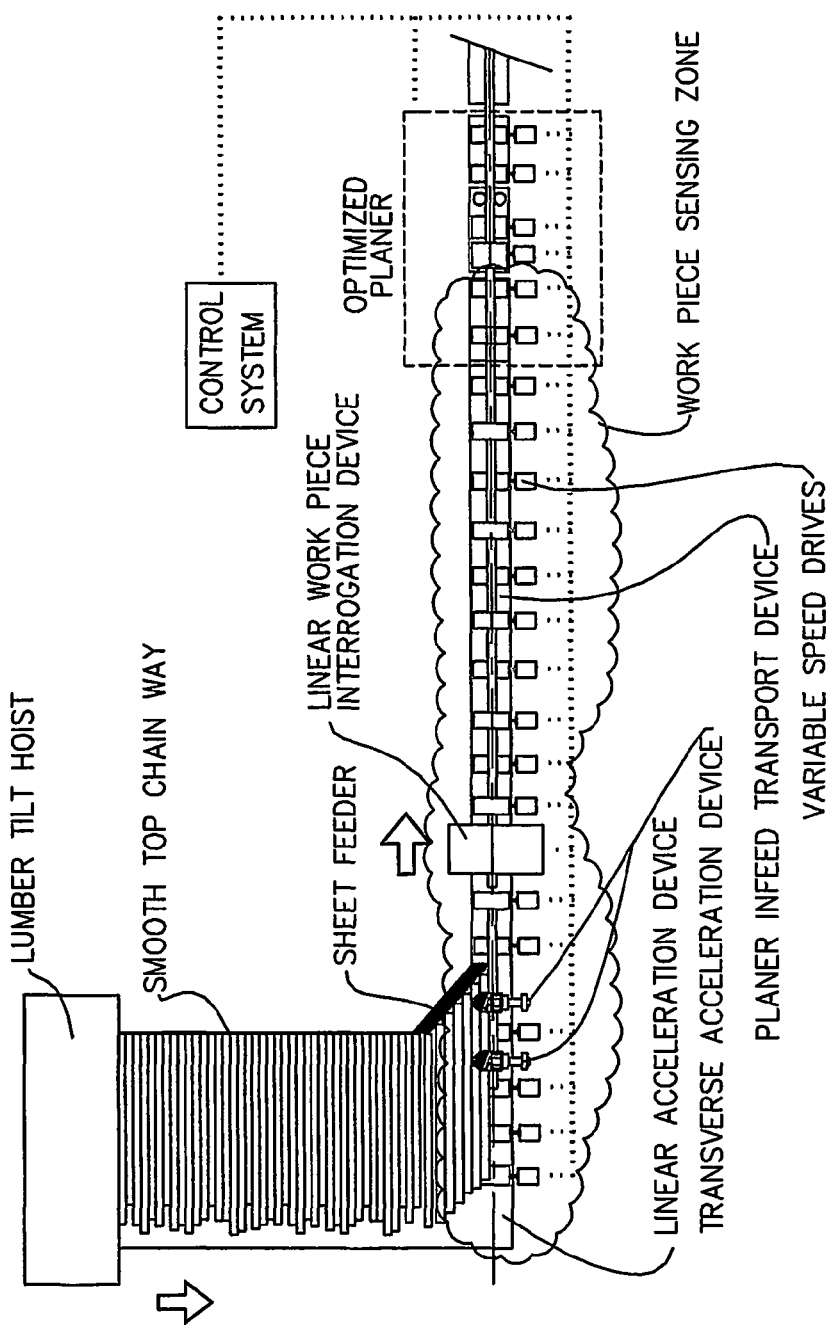
FIG. 28 is, in plan view, the planer infeed system of FIG. 27 after conversion to an optimized system.

Another example of converting a non-optimized planer system to an optimized planer system may be as shown in FIG. 27 and FIG. 28. The planer system shown in FIG. 27 is a non-optimized system that happens to have a very long planer infeed transport device. All of the speeds of the devices in this system are fixed speed and are set to feed the work pieces basically end-to-end with no gap between work pieces. FIG. 28 shows the system of FIG. 27 converted to an optimized planer system. In this example, there have been no modifications to the tilt hoist or the smooth transfer deck. However, the linear acceleration device along with the planer infeed transport device and planer have been fitted with variable speed drives. Individual rollers or groups of rollers have independent variable speed drives controlling their speed. A linear work piece interrogator has been added to the system near the midpoint of the planer infeed transport device. Work piece sensing has been added to the system from the linear acceleration device to and through the planer. The necessary planer modifications have been made to allow the moving or relocation of the guiding and/or cutting elements within the planer between work pieces. A computerized optimization system along with a computerized process control system are added to provide the work piece optimized planer solutions and generally control the flow of work pieces going through the system including establishing and/or controlling and/or correcting the minimum required gap between work pieces.

Gap-Reduction Modifications to the Optimized Planing Solutions

Reductions in the gap time required between subsequent work pieces can be made through gap-reduction modifications to the optimized planing solutions.

Reductions in the gap time required between subsequent work pieces can be made through the realization that certain movements of the guiding and/or cutting elements during the planing of a given work piece are possible for the sole purpose of gap reduction as long as those movements do not overly reduce the grade and quality of the finished work piece. These movements, called in-piece gap-reduction movements, are made within the constraints of the overall optimized planing solution and are governed by the defect profile of each individual work piece.

To illustrate, FIGS. 29, 30, 31 and 32 show examples of three rough work pieces (A, B and C) feeding an optimized planer. The dashed lines show the intended location of the finished side cuts oriented within the rough work pieces. Piece A is a rough work piece where the defect profile requires that the side cuts be made towards one side of the piece as shown. Piece B is a rough work piece with few physical defects and a fully intact geometric profile along its entire length. Therefore, piece B the side cuts can essentially be made anywhere within the piece. Piece C is a rough work piece where the defect profile requires that the side cuts be made towards the opposite side of the work piece (compared to piece A) as shown.

FIG. 29 shows one possible optimized gapping solution of the work pieces as they feed into the planer without the use of in-piece gap-reduction movements. Here the gap times between subsequent work pieces are determined by the amount of time required for the guiding and/or cutting elements to reposition between each individual piece. In this example, the guiding and/or cutting elements are moved to a centrally located position between pieces A and B resulting in required gap times of 125 ms between pieces A and B and 135 ms between pieces B and C.

FIG. 30 shows an optimized gapping solution of the work pieces with the use of in-piece gap-reduction movements. In this example, during the planing of piece B side-to-side movements of the guiding and/or cutting elements are made such that:

(a) when the trailing end of piece A leaves the planer the guiding and cutting elements are in position for the start of the solution for piece B, and (b) when the trailing end of piece B leaves the planer the guiding and cutting elements are in position for the start of the solution for piece C.

Note the complete elimination of the required gaps between the three work pieces.

FIGS. 31 and 32 show an example of an additional gap reduction strategy using the same work pieces as above where the ends of piece B are aligned against either piece A or piece C. The planing solution of piece B is modified so that it either corresponds with the trailing end of piece A or the leading end of piece C. This method of optimized gapping takes advantage of the time savings from reducing two movements of the guiding and/or cutting elements from A to B and B to C to one movement from A to B or B to C. Making a single guiding and/or cutting element movement saves time over making two movements because only one acceleration and deceleration are required instead of two. Note the reduction in the total required gap time in the example shown in FIGS. 31 and 32 compared to the required gap times shown in the example in FIG. 29. This method of gap reduction may or may not also use in-piece gap-reduction movements while planing.

Gap time reduction or elimination through the optimized planer is critical to increasing planermill throughput. The previous examples show that modifying the planing solution in one work piece using the information from the planing solutions of the surrounding pieces can lead to a reduction in the required gap times. Again, these gap-reduction modifications to the optimized planing solutions are made when permitted by the individual work piece defect profiles.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An infeed system for feeding an array of workpieces linearly downstream to a processing machine with at least one or more movable cutting elements or movable guiding elements, wherein the processing machine is an optimizing planer, a planer, a planer-matcher, or a moulder, the infeed system comprising:

a workpiece feed path, operatively coupled to the processing machine, the workpiece feed path including means for translating the array of workpieces downstream toward the processing machine; and means, operatively coupled to the workpiece feed path, for setting the size of gaps between successive workpieces in the array of workpieces being translated linearly into the processing machine;

wherein the means for setting the size of gaps is configured to set the gaps to provide enough time for at least one of the movable cutting elements or the movable guiding elements to be moved a position corresponding to the next successive workpiece in the array of workpieces.

2. The system of claim 1 wherein the gap is sized to leave only enough time for at least one of the movable cutting elements or the movable guiding elements to be moved to position corresponding to the next successive workpiece in the array of workpieces.

3. The system of claim 1 wherein said means for setting the size of gaps includes means for accelerating a workpiece of the array of workpieces along, and cooperating with, said workpiece feed path so as to control said size of gaps.

4. The system of claim 3 further comprising workpiece transportation means for transporting the workpiece downstream from said means for accelerating workpiece speed to said processing machine.

5. The system of claim 3 wherein the processing machine is an optimizing planer, the system further comprising:
   workpiece interrogation means for interrogating the workpiece to determine workpiece data corresponding to attributes of the workpiece, and
   a workpiece optimization system that receives the workpiece data corresponding to attributes of the workpiece from said workpiece interrogation means, determines an optimized cutting solution for the workpiece, and sends control instructions to said means for accelerating the workpiece.

6. The system of claim 3 wherein said means for accelerating the workpiece includes one or more of a fixed speed transverse acceleration device, a variable speed transverse acceleration device, a vertical acceleration device, a fixed speed linear acceleration device, and a variable speed linear acceleration device.

7. The system of claim 5 wherein said workpiece interrogation means includes one or more of a linear workpiece interrogator and a transverse workpiece interrogator.

8. The system of claim 4 wherein said workpiece transportation means includes one or more of a fixed speed intermediate transport device and a variable speed intermediate transport device.

9. The system of claim 3 wherein said workpiece feed path includes one or more of a sheet feeder, a fixed speed lug transfer and a variable speed lug transfer.

10. The system of claim 1 further comprising a trimmer with trim decision information corresponding to one or more of the successive workpieces; wherein the setting of said size of gaps is determined in part by the trim decision information.

11. The system of claim 1 further comprising a workpiece interrogator and means for determining in-piece gap-reduction for the successive workpieces in the array of workpieces, wherein said means for setting the size of gaps between successive workpieces is operatively coupled to the workpiece feed path and to said means for determining in-piece gap-reduction so as to reduce said size of gaps, the means for determining in-piece gap reduction being operatively coupled to the processing machine and configured to receive workpiece data corresponding to attributes of the successive workpieces from said workpiece interrogator, to determine an optimized planing solution for each of the successive workpieces, and to send control instructions to said means for setting the size of the gaps between successive workpieces,
   wherein the optimized planing solution for a first workpiece of said successive workpieces provides for in-piece setting of the movable cutting elements to pre-position the movable cutting elements for commencing the optimized planing solution for a second workpiece in upstream of the first workpiece, whereby said size of gap between said first and second workpieces is reduced.

12. The system of claim 11 wherein said size of gap is reduced to a substantially zero gap.

13. The system of claim 5 wherein said workpiece optimization system is operatively coupled to said movable cutting elements and further comprises means for determining in-piece gap-reduction for a successive series of workpieces in the array of workpieces, wherein said means for setting the size of gaps between successive workpieces is operatively coupled to said means for determining in-piece gap-reduction so as to reduce said size of gaps, where the optimized planing solution for a first workpiece of said successive series of workpieces provides for in-piece setting of the cutting elements within a second workpiece of said successive series of workpieces so as to pre-position the cutting elements for commencing the optimized planing solution for a second adjacent upstream workpiece of said successive series of workpieces, whereby said size of gap between said downstream and upstream workpieces is reduced.

14. The system of claim 13 wherein said size of gap is reduced to substantially zero gap.

15. The system of claim 1 wherein the processing machine is a planer, the system further comprising:
   (a) workpiece sensing means for sensing one or more of the position, velocity and acceleration of a workpiece in the array of workpieces upstream of the planer; and
   (b) a control system configured to receive data from said workpiece sensing means and to use said data from said workpiece sensing means to control said size of gaps to do one or more of establish, control and correct a minimum required gap between each pair of successive workpieces of the array of workpieces.

16. The system of claim 1, wherein said size of gap includes a safety factor.

17. The system of claim 5 further comprising:
   (a) workpiece sensing means for sensing one or more of the position, velocity and acceleration of a workpiece in the array of workpieces upstream of the planer; and
   (b) a control system configured to receive data from the workpiece sensing means and to control the size of gaps to do one or more of establish, control, and correct a minimum required gap between each pair of successive workpieces in the array of workpieces.

18. The system of claim 17 wherein the control system and the workpiece optimization system are combined into a singular gap optimization system.

19. An infeed system configured to feed an array of workpieces linearly downstream to a processing machine with at least one or more movable cutting elements or movable guiding elements, wherein the processing machine is an optimizing planer, a planer, a planer-matcher, or a moulder, the infeed system comprising:
   a workpiece feed path operatively coupled to the processing machine;
   one or more workpiece acceleration devices, operatively coupled to the workpiece feed path, configured to adjust the speed of a workpiece in the array of workpieces;
   one or more workpiece sensors operatively coupled to the workpiece feed path and configured to determine one or more of the position, velocity and acceleration of the workpiece;
   a control system coupled to the one or more workpiece sensors and to the one or more workpiece acceleration devices, the control system configured to receive the data from the one or more workpiece sensors and to adjust the speed of the one or more workpiece acceleration devices in order to set the gap between successive workpieces in the array of workpieces.

20. The infeed system of claim 19, wherein the processing machine is an optimizing planer coupled to the control system and configured to determine optimized planing solutions for each of the successive workpieces, and wherein the gaps between the successive workpieces are set to allow enough time for the one or more movable cutting elements or movable guiding elements in the processing machine to be moved to a position corresponding to the optimized planing solution for the next successive workpiece.

21. An infeed system comprising:

an infeed conveyor describing a path of workpiece flow, the infeed conveyor configured to transport a first and a second workpiece sequentially downstream along said path;

an acceleration device coupled to the infeed conveyor and configured to adjust the velocity of the first and the second workpieces along said path;

a variable speed drive coupled to the acceleration device and configured to control the acceleration device;

a workpiece sensor coupled to the infeed conveyor and configured to generate data corresponding to one or more attributes of the first and the second workpiece, said one or more attributes including at least one of position, velocity, and acceleration;

a cutting apparatus operatively coupled to the control system, the cutting apparatus having at least one movable guiding or cutting element, wherein the cutting apparatus is an optimizing planer, a planer, a planer-matcher, or a moulder; and a control system coupled to the workpiece sensor and the variable speed drive, the control system configured to
receive said data from the workpiece sensor,
determine a length of time required to reposition the at least one movable guiding or cutting element between the first and second workpieces,
determine a desired gap between the first and second workpieces on said infeed conveyor based at least in part on said data and said length of time, and
send an instruction to the variable speed drive, the instruction
comprising a command for adjusting operation of the acceleration device, wherein adjusting operation of the acceleration device adjusts the distance between the first and second workpieces to create the desired gap.

22. The infeed system of claim 21, further comprising an optimizer coupled to the control system, the optimizer configured to determine an optimized cutting solution for at least one of said first and said second workpiece.

23. The infeed system of claim 21, wherein said one or more attributes further includes at least one of work piece geometry and defect information.

24. The infeed system of claim 21, the cutting apparatus positioned downstream of said acceleration device.

25. The infeed system of claim 22, the optimizer further configured to determine a trimming solution for at least one of the first and second workpieces.

26. The infeed system of claim 25, the control system further configured to determine the desired gap between the first and second workpieces based at least in part on one or more of said optimized cutting solution and said trimming solution.

* * * * *

UNITED STATES PATENT AND TRADEMARK OFFICE
CERTIFICATE OF CORRECTION

| | | |
|---|---|---|
| PATENT NO. | : 7,870,880 B2 | Page 1 of 1 |
| APPLICATION NO. | : 10/552856 | |
| DATED | : January 18, 2011 | |
| INVENTOR(S) | : Ronald W. McGehee and Patrick Doyle | |

It is certified that error appears in the above-identified patent and that said Letters Patent is hereby corrected as shown below:

In the Claims

Column 20, line 56, "to be moved a position" should read --to be moved to a position--;
Column 20, lines 60-61, "to be moved to position" should read --to be moved to the position--;
Column 21, lines 54-55, "second workpiece in upstream of the first workpiece" should read --second workpiece upstream of the first workpiece--.

Signed and Sealed this
Seventeenth Day of March, 2015

Michelle K. Lee
*Director of the United States Patent and Trademark Office*